United States Patent
Weinstein

(10) Patent No.: US 8,322,230 B2
(45) Date of Patent: *Dec. 4, 2012

(54) VIBRATORY FLOW METER FOR DETERMINING ONE OR MORE FLOW FLUID CHARACTERISTICS OF A MULTI-PHASE FLOW FLUID

(75) Inventor: Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/937,587

(22) PCT Filed: Apr. 29, 2009

(86) PCT No.: PCT/US2009/042019
§ 371 (c)(1),
(2), (4) Date: Oct. 13, 2010

(87) PCT Pub. No.: WO2009/134830
PCT Pub. Date: Nov. 5, 2009

(65) Prior Publication Data
US 2011/0023626 A1 Feb. 3, 2011

Related U.S. Application Data

(60) Provisional application No. 61/049,664, filed on May 1, 2008.

(51) Int. Cl.
*G01F 1/84* (2006.01)
(52) U.S. Cl. .................................. 73/861.357
(58) Field of Classification Search ............... 73/861.23, 73/861.357
See application file for complete search history.

(56) References Cited

U.S. PATENT DOCUMENTS

| 6,272,438 B1 | 8/2001 | Cunningham et al. |
| 6,408,700 B1 | 6/2002 | Matt et al. |
| 6,945,094 B2 | 9/2005 | Eggen et al. |

(Continued)

FOREIGN PATENT DOCUMENTS

EP 1102968 A1 5/2001

(Continued)

OTHER PUBLICATIONS

U.S. Appl. No. 12/936,646, Weinstein, Apr. 29, 2009.*

(Continued)

*Primary Examiner* — Jewel V Thompson
(74) *Attorney, Agent, or Firm* — The Ollila Law Group LLC

(57) ABSTRACT

A vibratory flow meter (5) for determining one or more flow fluid characteristics of a multi-phase flow fluid includes one or more flow conduits (103A,103B). The flow meter assembly (10) is configured to generate a very low frequency response that is below a predetermined minimum decoupling frequency for the flow fluid and to generate a very high frequency response that is above a predetermined maximum decoupling frequency for the flow fluid, independent of the foreign material size or the foreign material composition. The meter (100) further includes meter electronics (20) configured to receive one or more very low frequency vibrational responses and one or more very high frequency vibrational responses and determine the one or more flow fluid characteristics from the one or more very low frequency vibrational responses and the one or more very high frequency vibrational responses.

25 Claims, 15 Drawing Sheets

U.S. PATENT DOCUMENTS

| | | |
|---|---|---|
| 7,360,453 B2 | 4/2008 | Rieder et al. |
| 7,412,903 B2 | 8/2008 | Rieder et al. |
| 2004/0040387 A1 | 3/2004 | Nakao et al. |
| 2007/0001028 A1 | 1/2007 | Gysling |

FOREIGN PATENT DOCUMENTS

| | | |
|---|---|---|
| EP | 1348115 A1 | 1/2003 |
| EP | 0733886 B1 | 8/2004 |
| RU | 2295120 C2 | 10/2007 |
| WO | 0169040 A1 | 9/2001 |
| WO | 03095949 A1 | 11/2003 |
| WO | 2004063741 A2 | 7/2004 |
| WO | 2006107297 A1 | 10/2006 |
| WO | 2007022118 A1 | 2/2007 |

OTHER PUBLICATIONS

U.S. Appl. No. 12/937,442, Weinstein, Apr. 29, 2009.*

* cited by examiner

| COMPONENT | MASS | CENTER OF GRAVITY BEFORE | CENTER OF GRAVITY AFTER |
|---|---|---|---|
| (1) FLUID HEMISPHERE | $m_1 = -\rho_f \left(\frac{1}{2}\right)\left(\frac{4}{3}\pi a^3\right)$ | $\overline{q}_1 = \frac{3a}{8}$ | $\overline{q}_1 = \left(A_p - A_f\right) - \frac{3a}{8}$ |
| (2) FLUID CYLINDER | $m_2 = \rho_f (\pi a^2)\left(A_p - A_f\right)$ | $\overline{q}_2 = \frac{A_p - A_f}{2}$ | $\overline{q}_2 = \frac{A_p - A_f}{2}$ |
| (3) FLUID HEMISPHERE | $m_3 = \rho_f \left(\frac{1}{2}\right)\left(\frac{4}{3}\pi a^3\right)$ | $\overline{q}_3 = \left(A_p - A_f\right) + \frac{3a}{8}$ | $\overline{q}_3 = -\frac{3a}{8}$ |
| (4) PARTICLE SPHERE | $m_4 = \rho_p \left(\frac{4}{3}\pi a^3\right)$ | $\overline{q}_4 = 0$ | $\overline{q}_4 = A_p - A_f$ |

FIG.10

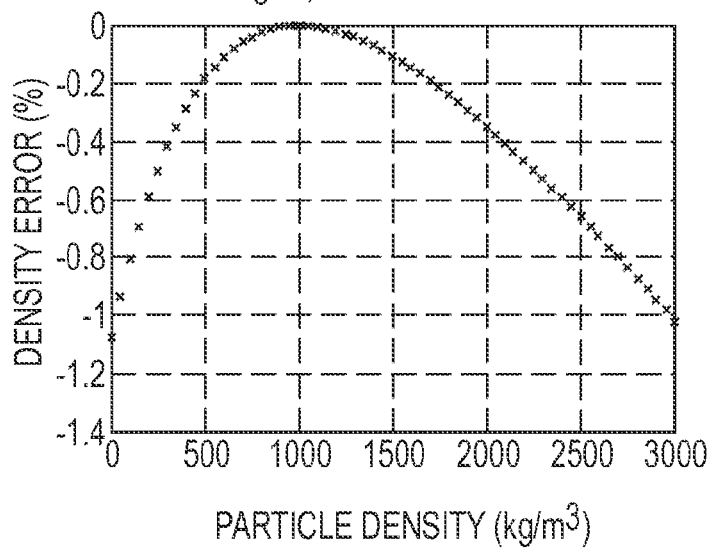

FIG.11

VIBRATORY FLOW METER FOR DETERMINING ONE OR MORE FLOW FLUID CHARACTERISTICS OF A MULTI-PHASE FLOW FLUID

CROSS-REFERENCE TO RELATED APPLICATIONS

This is a National Stage entry of International Application No, PCT/US2009/042019, with an international filing date of Apr. 29, 2009, which claims priority of U.S. provisional patent application No. 61/049,664, filed May 1, 2008 entitled "METHOD AND APPARATUS FOR DETERMINING PARAMETERS IN A MULTIPHASE FLOW".

BACKGROUND OF THE INVENTION

1. Field of the Invention

The present invention relates to a vibratory flow meter, and more particularly, to a vibratory flow meter for determining one or more flow fluid characteristics of a multi-phase flow fluid.

2. Statement of the Problem

Vibratory flow meters, such as Coriolis mass flow meters and vibratory densitometers, typically operate by detecting motion of a vibrating conduit that contains a flowing or non-flowing fluid. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical vibratory flow meter includes one or more conduits that are connected inline in a pipeline or other transport system and convey material, e.g., fluids, slurries and the like, in the system. A conduit may be viewed as having a set of natural vibration modes, including for example, simple bending, torsional, radial, and coupled modes. In a typical measurement application, a conduit is excited in one or more vibration modes as a material flows through the conduit and motion of the conduit is measured at points spaced along the conduit. Excitation is typically provided by an actuator, e.g., an electromechanical device, such as a voice coil-type driver, that perturbs the conduit in a periodic fashion. Fluid density may be obtained by determining a resonant frequency of the flow fluid. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Flow meters are used to perform mass flow rate and/or density measurements for a wide variety of fluid flows and offer high accuracy for single phase flows. One area in which vibratory flow meters are used is in the metering of oil and gas well outputs. The product of such wells can comprise a multi-phase flow, including liquids but also including gases and/or solids that can be entrained in the flow fluid. An oilfield flow fluid therefore can include oil, water, air or other gases, and/or sand or other soil particulates, for example. However, when a vibratory flow meter is used to measure flow fluids including entrained gases and/or solids, the accuracy of the meter can be significantly degraded. It is highly desirable that the resulting metering be as accurate as possible, even for such multi-phase flows.

The multi-phase flow fluids can include entrained gases, especially bubbly gas flows. The multi-phase flows can include entrained solids or entrained solid particles, mixtures such as concrete, etc. Further, multi-phase flows can include liquids of different densities, such as water and petroleum components, for example. The phases may have different densities, viscosities, or other properties.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing particle sizes or vibrational frequencies. The decoupling may even occur where the multi-phase flow includes liquids of differing densities and/or viscosities. The decoupling action has been found to be affected by various factors, such as the viscosity of the flow fluid and the difference in density between the flow fluid and the foreign material, for example.

In addition to problems caused by the relative motion of bubbles and particles, Coriolis meters can experience accuracy degradation from speed of sound (SOS), or compressibility, effects when the sonic velocity of the measurement fluid is low or the oscillation frequency of the meter is high. Liquids have higher sonic velocities than gases, but the lowest velocities result from a mixture of the two. Even a small amount of gas entrained in a liquid results in a dramatic reduction in the speed of sound of the mixture, below that of either phase.

The oscillation of the flow tube produces sound waves that oscillate in the transverse direction at the drive frequency of the meter. When the speed of sound of the fluid is high, as in a single phase fluid, the first acoustic mode for transverse sound waves across the circular conduit is at a much higher frequency than the drive frequency. However, when the speed of sound drops due to the addition of gas to a liquid, the frequency of the acoustic mode also drops. When the frequency of the acoustic mode and the drive mode are close, meter errors result due to the off-resonance excitation of the acoustic mode by the drive mode.

For low frequency meters and typical process pressures, velocity of sound effects are present in multiphase flows but are usually negligible with respect to the specified accuracy of the meter. However, for high frequency Coriolis meters operating at low pressures with bubbly fluids, the velocity of sound can be low enough to cause significant measurement errors due to interaction between the drive and fluid vibration modes.

The size of the bubbles can vary, depending on the amount of gas present, the pressure of the flow fluid, temperature, and the degree of mixing of the gas into the flow fluid. The extent of the decrease in performance is not only related to how much total gas is present, but also to the size of the individual gas bubbles in the flow. The size of the bubbles affects the accuracy of the measurement. Larger bubbles occupy more volume and decouple to a further extent, leading to fluctuations in the density and measured density of the flow fluid. Due to the compressibility of a gas, the bubbles can change in gas amount, or mass, yet not necessarily change in size. Conversely, if the pressure changes, the bubble size can correspondingly change, expanding as the pressure drops or shrinking as the pressure increases. This can also cause variations in the natural or resonant frequency of the flow meter.

Prior art vibratory flow meters are typically designed for operating frequencies around 100 to 300 Hertz (Hz), with some meters operating at frequencies between 500 and 1,000 Hz. The operating frequency in a prior art vibratory flow meter is typically chosen in order to facilitate the flow meter design, production, and operation. For example, a prior art vibratory or Coriolis flow meter is configured to be physically compact and substantially uniform in dimensions. For example, a height of a prior art flow meter is typically less than the length, giving a low height-to-length aspect ratio (H/L) and a corresponding high drive frequency. Flow meter users prefer a small overall size so that installation is simplified. Further, flow meter design commonly assumes a uniform, single-phase fluid flow and is designed to optimally operate with such a uniform flow fluid.

In the prior art, flow meters typically have a low height-to-length aspect ratio (H/L). A straight conduit flow meter has a height-to-length aspect ratio of zero, which typically produces a high drive frequency. Bowed flow conduits are often used to keep the length from being the dominant dimension and will increase the height-to-length aspect ratio (H/L). However, prior art flow meters are not designed with high aspect ratios. A curved or bowed conduit flow meter in the prior art may have a height-to-length aspect ratio approaching 1.3, for example.

There remains a need in the art for a vibratory flow meter that is capable of accurately and reliably measuring multi-phase flow fluids.

ASPECTS OF THE INVENTION

In one aspect of the invention, a vibratory flow meter for determining one or more flow fluid characteristics of a multi-phase flow fluid comprises:

a flow meter assembly including one or more flow conduits with the flow meter assembly being configured to generate a very low frequency response that is below a predetermined minimum decoupling frequency for the flow fluid and to generate a very high frequency response that is above a predetermined maximum decoupling frequency for the flow fluid, independent of the foreign material size or the foreign material composition; and meter electronics coupled to the flow meter assembly and configured to receive one or more very low frequency vibrational responses and one or more very high frequency vibrational responses and determine the one or more flow fluid characteristics from the one or more very low frequency vibrational responses and the one or more very high frequency vibrational responses.

Preferably, the meter electronics is configured such that a decoupling ratio $(A_p/A_f)$ is about 1:1 for the very low frequency and is configured such that a decoupling ratio $(A_p/A_f)$ is about 3:1 for entrained gas at the very high frequency and is about equal to $3/(1+(2*\rho_p/\rho_f))$ for entrained solids at the very high frequency.

Preferably, the meter electronics is configured such that a viscosity is effectively infinity with regard to particle motion for the flow fluid at the very low frequency and is configured such that a viscosity is effectively zero with regard to particle motion for the flow fluid at the very high frequency.

Preferably, the very low frequency is below a predetermined minimum SOS/compressibility threshold, independent of a foreign material size or a foreign material composition.

Preferably, the very low frequency vibrational response corresponds to an inverse Stokes number (δ) that is above about 3.5 and the very high frequency vibrational response corresponds to an inverse Stokes number (δ) that is less than about 0.1.

Preferably, the one or more flow conduits are configured to achieve the very low frequency and the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

Preferably, the vibratory flow meter is configured to operate at a first bending mode and higher bending mode frequencies.

Preferably, the vibratory flow meter is operated at a plurality of frequencies to generate a plurality of vibrational responses, wherein the plurality of vibrational responses are compared in order to determine an approximate onset of multi-phase effects.

Preferably, the flow meter assembly comprises two or more flow meter assemblies that are vibrated to generate the very low frequency response and the very high frequency response.

In one aspect of the invention, a method for determining one or more flow fluid characteristics of a multi-phase flow fluid comprises:

vibrating a vibratory flow meter assembly at one or more very low frequencies that are below a predetermined minimum decoupling frequency for the flow fluid and vibrating the flow meter assembly at one or more very high frequencies that are above a predetermined maximum decoupling frequency for the flow fluid, independent of the foreign material size or the foreign material composition;

receiving one or more very low frequency vibrational responses and one or more very high frequency vibrational responses; and determining the one or more flow fluid characteristics from the one or more very low frequency vibrational responses and the one or more very high frequency vibrational responses.

Preferably, the one or more very low frequencies result in a decoupling ratio $(A_p/A_f)$ of about 1:1 and the one or more very high frequencies result in a decoupling ratio $(A_p/A_f)$ of about 3:1 for entrained gas and about equal to $3/(1+(2*\rho_p/\rho_f))$ for entrained solids.

Preferably, the one or more very low frequencies result in a viscosity that is effectively infinity with regard to particle motion for the flow fluid and the one or more very low frequencies result in a viscosity that is effectively zero.

Preferably, the one or more very low frequencies are below a predetermined minimum SOS/compressibility threshold, independent of a foreign material size or a foreign material composition.

Preferably, the one or more very low frequency vibrational responses correspond to an inverse Stokes number (δ) that is above about 3.5 and the one or more very high frequency vibrational responses correspond to an inverse Stokes number (δ) that is less than about 0.1.

Preferably, the vibratory flow meter is configured to operate at a first bending mode and higher bending mode frequencies.

Preferably, the vibratory flow meter is operated at a plurality of frequencies to generate a plurality of vibrational responses, wherein the plurality of vibrational responses are compared in order to determine an approximate onset of multi-phase effects.

Preferably, vibrating the vibratory flow meter assembly at the one or more very low frequencies and at the one or more very high frequencies comprises vibrating two or more vibratory flow meter assemblies.

In one aspect of the invention, a method of forming a vibratory flow meter for determining one or more flow fluid characteristics of a multi-phase flow fluid comprises:

determining at least one predetermined very low frequency and at least one predetermined very high frequency for the vibratory flow meter based on at least an expected flow fluid, with the at least one predetermined very low frequency being below a predetermined minimum decoupling frequency and with the at least one predetermined very high frequency being above a predetermined maximum decoupling frequency for the flow fluid, independent of a foreign material size or a foreign material composition;

selecting one or more flow conduit design characteristics based on the at least one predetermined very low frequency and on the at least one predetermined very high frequency, with the one or more flow conduit design characteristics being selected to substantially achieve the at least one predetermined very low frequency and the at least one predetermined very high frequency; and constructing the vibratory flow meter employing the selected one or more flow conduit design characteristics.

Preferably, the at least one predetermined very low frequency results in a decoupling ratio $(A_p/A_f)$ of about 1:1 and the at least one predetermined very high frequency results in a decoupling ratio $(A_p/A_f)$ of about 3:1 for entrained gas and about equal to $3/(1+(2*\rho_p/\rho_f))$ for entrained solids.

Preferably, the at least one predetermined very low frequency results in a viscosity that is effectively infinity with regard to particle motion for the flow fluid and the at least one predetermined very high frequency results in a viscosity that is effectively zero.

Preferably, the at least one predetermined very low frequency is below a predetermined minimum SOS/compressibility threshold, independent of a foreign material size or a foreign material composition.

Preferably, the at least one predetermined very low frequency corresponds to an inverse Stokes number ($\delta$) that is above about 3.5 and the at least one predetermined very high frequency corresponds to an inverse Stokes number ($\delta$) that is less than about 0.1.

Preferably, the vibratory flow meter is configured to operate at a first bending mode and higher bending mode frequencies.

Preferably, the vibratory flow meter is operated at a plurality of frequencies to generate a plurality of vibrational responses, wherein the plurality of vibrational responses are compared in order to determine an approximate onset of multi-phase effects.

Preferably, vibrating the vibratory flow meter assembly at the one or more very low frequencies and at the one or more very high frequencies comprises vibrating two or more vibratory flow meter assemblies.

DESCRIPTION OF THE DRAWINGS

The same reference number represents the same element on all drawings. It should be understood that the drawings are not necessarily to scale.

FIG. 10 gives the locations of the CG of the particles and of the liquid components.

FIG. 11 is a graph of decoupling density error versus particle density.

DETAILED DESCRIPTION OF THE INVENTION

FIGS. 1-17 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
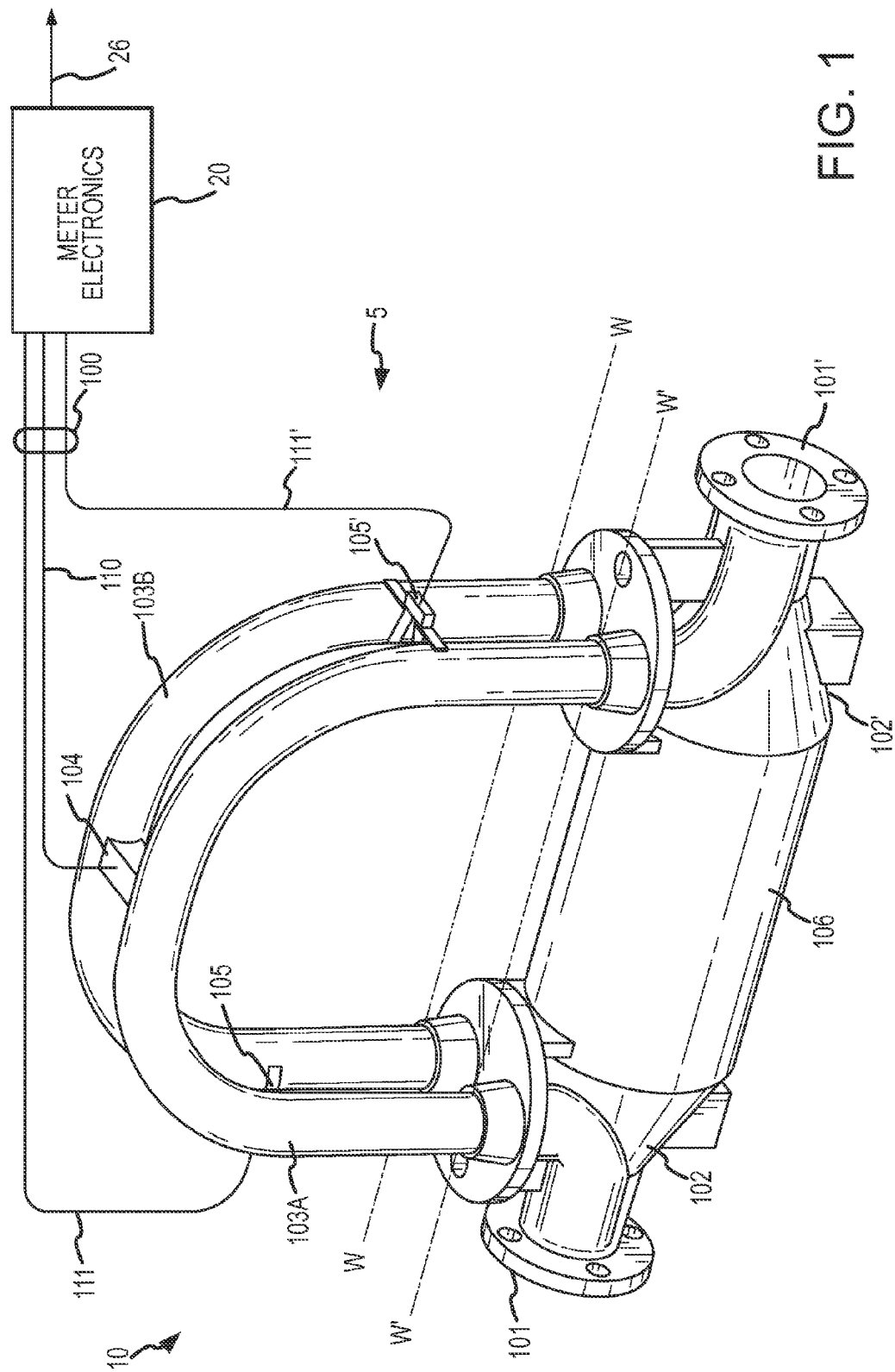
FIG. 1 shows a vibratory flow meter according to the invention.

FIG. 1 shows a vibratory flow meter 5 according to the invention. The vibratory flow meter 5 is designed to measure fluid characteristics of a flow fluid, including measuring either a flowing or stationary flow fluid. The vibratory flow meter 5 in one embodiment comprises a Coriolis flowmeter. In another embodiment, the vibratory flow meter 5 comprises a vibrating densitometer.

The vibratory flow meter 5 includes a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of vibratory flow meter regardless of the number of drivers, pick-off sensors, flow conduits, or the operating mode of vibration. It should be recognized that the flow meter 5 can comprise a vibratory densitometer and/or a Coriolis mass flow meter.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

In one embodiment, the flow conduits 103A and 103B comprise substantially U-shaped flow conduits, as shown. Alternatively, in other embodiments, the flow conduits can comprise substantially straight flow conduits. However, other shapes can also be used and are within the scope of the description and claims.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow fluid being measured, the flow fluid enters the flow meter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. However, the flow conduits 103A and 103B can alternatively be vibrated at a second out of phase bending mode or higher, if desired. This may be done for calibration or testing activities, fluid viscosity tests, or for obtaining measurement values at different vibrational frequencies. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a vibratory flow meter and is not intended to limit the teaching of the present invention.

When operating as a densitometer, the flow meter 5 can measure the density of single phase or multi-phase flows. The measurement of the multi-phase flow density is problematic, as the density measurement will be affected by the components of the multi-phase flow, whether including entrained gas or entrained solids. The flow meter 5 will measure the density of the mixture, but it is typically desired that the density measurement be the density of just the liquid component(s), as any entrained gas or solids will commonly comprise unwanted components. Not only do the bubbles or solids cause a change in the true mixture density, decoupling and other multiphase error mechanisms cause additional error away from mixture density.

Density is measured in a vibratory flow meter by determining the resonant (i.e., natural) frequency of flow conduit oscillation. The greater the density of the flow fluid, the greater the mass of the flow meter assembly 10 and the lower the natural frequency of the flow meter assembly 10 as a whole. The density measurement of the flow meter 5 is independent of the flow rate and can be performed with a flowing or non-flowing fluid.

The flow meter 5 can measure the density when two or more components are present and can generate a mixture density ($\rho_{mixture}$) for a multi-phase flow fluid. If it is assumed that there are no errors due to decoupling, asymmetries, velocity of sound, or other multi-phase effects, the density measured by a vibratory meter will be very close to the actual mixture density, as shown in equation (1), below. If the densities of the flow components are known, then the mass flow rates of individual components may be estimated, assuming no bubble slip. The ($\phi$) terms represent volume fractions of the components. The individual fractions must sum to unity.

$$\rho_{mixture} = \rho_{fluid}\phi_{fluid} + \rho_{particle}\phi_{particle}+ \quad (1)$$

A user interested in measuring only the liquid density will incur an error proportional to the volume fraction if a single entrained phase is present. The density error for a multi-phase flow fluid can be represented as:

$$\rho_{error} = \rho_{mixture} - \rho_{fluid} = \phi_{particle}(\rho_{particle} - \rho_{fluid}) \quad (2)$$

For example, if a user expects a liquid density of 1000 kg/m$^3$, but the fluid has 10% volume fraction of entrained gas, a prior art Coriolis mass flow meter (operating at a prior art vibrational frequency) will measure roughly 900 kg/m$^3$, giving a (−100) kg/m$^3$ density error. Even though the prior art meter has correctly measured the mixture density, including both the liquid component and the gas component, the user interprets this as a −10% error from the desired liquid density. The volume flow rate is subsequently found by dividing the measured multi-phase mass flow rate by the measured multi-phase density, so the mixture volume flow rate is about 10% higher than liquid flow rate. However, the user typically desires the mass flow or volume flow rate of just the liquid component of the multi-phase flow fluid.

The error in density is further compounded by errors due to decoupling effects and SOS/compressibility effects, both of which are due to the vibration of the multi-phase flow fluid. Vibration of a single phase will not exhibit the decoupling and SOS/compressibility effects.

Measurement errors are exacerbated in a multi-phase flow fluid including entrained gas. Entrained gas will exhibit more decoupling and more SOS/compressibility effects than will entrained solids. This is due to the large difference in density between gas and liquid, which results in relative motion between the phases, and due to the compressibility of the mixture, which results in unwanted off-resonance vibrational responses. Entrained solids will not suffer from compressibility effects but will exhibit errors due to decoupling and viscosity effects. The decoupling effect for solids are less severe than for gases, but will still affect measurements.

Measurement errors are addressed herein by operating the flow meter 5 at specific vibrational frequencies, frequencies that produce known decoupling, and compressibility effects. It has been found that operation of the flow meter 5 at these vibrational extremes allows for the determination of correct measurements for density, mass flow, and other variables.

It has been found that at very low vibrational frequencies, the decoupling of the foreign material, whether gas or solids, is practically nonexistent and the decoupling ratio is about 1:1, i.e., the entrained gas or solids particles move the same distance as the liquid component of the flow fluid. Similarly, at very low vibrational frequencies, the viscosity of the flow fluid acts as if it is approximately infinite, wherein the entrained foreign material moves with the flow fluid. Further, at very low vibrational frequencies there are no SOS/compressibility effects. As a result, the decoupling ratio ($A_p/A_f$) can be assumed to be one, the compression can be assumed to be zero (wherein the speed of sound (c) is assumed to be the SOS of the flow fluid), and the viscosity is assumed to be an infinite value (i.e., similar to a solid).

It should be understood that the most common and least difficult and least expensive approach is to avoid multi-phase flow fluids. However, this is not always practical or possible. The approach discussed herein is not to avoid multi-phase decoupling and SOS/compressibility effects, but instead to operate a flow meter in such a way as to generate a known and substantially constant error effect. As a result, derivations of flow measurements are simplified. Errors in measurement can be then removed.

It has been found that at very high vibrational frequencies, the decoupling effects can reach an upper limit. This upper limit provides heretofore unrecognized benefits. The decoupling is therefore known and predictable. For example, for entrained gas, the decoupling approaches about a 3:1 decoupling ratio, wherein gas bubbles move about three times the distance that the liquid component of the flow fluid moves. For entrained solids, at very high vibrational frequencies, the decoupling ratio will be about equal to the quantity $3/(1+(2*\rho_p/\rho_f))$. If the density of the solid particle is much greater than the liquid, then the entrained solid particles will remain substantially stationary while the liquid component moves with the flow conduit vibration. At very high vibrational frequencies, the viscosity of the flow fluid acts as if it is approximately zero, with the entrained foreign matter not being constrained by fluid viscosity.

Compressibility will not apply to entrained solids. Consequently, the very high frequency vibratory flow meter 5 can be vibrated at a frequency equal to or greater than the upper limit frequency for the decoupling. Any resulting SOS/compressibility effects can be compensated for using conventional techniques.

Liquids have higher sonic velocities than gases, but the lowest velocities result from a mixture of the two. The addition of even a small amount of gas to a liquid results in a dramatic reduction in the speed of sound of the mixture below that of either phase. A small amount of gas dramatically increases mixture compressibility, while the mixture density remains close to that of the liquid.

When the speed of sound of the fluid is high, as in a single phase fluid, the first acoustic mode for transverse sound waves across the circular conduit is at a much higher frequency than the drive frequency. However, when the speed of sound drops due to the addition of gas to a liquid, the frequency of the acoustic mode also drops.

For low frequency meters and typical process pressures, velocity of sound effects are present in multiphase flows but are usually negligible with respect to the specified accuracy of the meter. However, for high frequency vibratory flow meters operating at low pressures with bubbly fluids, the velocity of sound can be low enough to cause significant measurement errors due to interaction between the drive and fluid vibration modes.

A more physical explanation of velocity of sound effects in vibratory flow meters is that the fluid in the tube is compressed against the outside wall of the tube on each oscillation, when the compressibility of the mixture is high enough to allow for such motion. In this way, velocity of sound effects are similar to decoupling effects in that the actual error is caused by movement of the location of the center of gravity. The difference is that velocity of sound effects result in heavier fluid pushed to the outside walls of the tube while decoupling results in heavier fluid pushed to the inside walls of the tube. For this reason, velocity of sound errors are positive and decoupling errors are negative.

Consequently, the flow meter 5 can be operated at either a very low frequency or at a very high frequency. The resulting measurements can be employed as discussed below (see FIG. 17 and the accompanying discussion). The above assumptions or known values can be used in order to derive improved density and/or mass flow measurements, among other things.

The vibratory flow meter 5 is designed to accurately and reliably measure the flow fluid when the flow fluid comprises multiple phases. The multi-phase flow fluid can include entrained gas in some embodiments, wherein the entrained gas can comprise a bubbly flow. The entrained gas can include air bubbles or bubbles of various sizes. Entrained gas is problematic in prior art vibratory flow meters. The entrained gas, especially for moderate to large bubbles, can move independently of the flow fluid and cause measurement errors or uncertainties. In addition, the entrained gas can cause varying measurement effects due to compressibility of the gas varying with the operating pressure of the flow fluid.

The multi-phase flow fluid can include entrained solids in some embodiments, wherein the entrained solids can comprise a slurry. One example comprises sand or soil particles in a petroleum flow. The entrained solids can move independently of the flow fluid and cause measurement errors and/or uncertainties.

In some embodiments, the multi-phase flow can include differing liquids, such as immiscible liquids that cannot be mixed together. For example, the flow fluid can include both water and oil. Where the fluid flow components have differing densities, the fluid flow components may experience some decoupling during flow meter vibration. The foreign objects can be less dense than the flow fluid. The foreign objects can be denser than the flow fluid.

In operation, the vibratory flow meter 5 can be vibrated at a very low frequency and/or a very high frequency. The very low frequency can comprise a first bending mode vibration. However, other vibrational modes are contemplated and are within the scope of the description and claims. For example, in some embodiments the flow meter assembly 10 can be driven off-resonance at a predetermined low frequency, wherein the mass flow rate (and/or other flow characteristics) are subsequently measured. The predetermined low frequency can therefore be less than the resonant frequency. The resulting mass flow measurement will be substantially immune to decoupling and SOS effects and can be determined through phase measurement at the predetermined low frequency. The predetermined low frequency can be chosen to correspond to an inverse Stokes number ($\delta$) greater than a threshold value selected to substantially eliminate multiphase errors. Density measurement at an off-resonance frequency will not be possible due to the fact that the frequency has been specifically chosen rather than measured. The challenge of this type of operation is that the response amplitude of the conduit will be small due to the off-resonant vibration. However, this challenge can be overcome by inputting additional drive power or by averaging phase measurements to help reject noise.

The flow fluid can be either stationary or flowing, as previously discussed. As a result, when vibrated at a very low frequency, the flow meter 5 produces a very low frequency vibrational response.

Alternatively, the flow meter 5 can produce a very high frequency vibrational response. The very high frequency can comprise a first bending mode vibration. Alternatively, the very high frequency can comprise a second, third, or higher bending mode vibration. However, other vibrations, such as off-resonance vibrations, are contemplated and are within the scope of the description and claims. As a result, the very high frequency vibratory flow meter 5 produces a very high frequency vibrational response. The very high frequency vibrational response is processed in order to determine, for example, a response frequency, a response amplitude, and a response phase delay between pickoffs. The very high response frequency can be used to determine one or more flow fluid characteristics, including a mass flow rate, density, viscosity, et cetera.

The very low frequency or very high frequency vibrational response is processed in order to determine at least a response frequency. The response frequency can be used to determine one or more flow fluid characteristics, including a mass flow rate, density, viscosity, et cetera. The very low frequency and/or very high frequency nature of the flow meter 5 is discussed further below.

An advantage of the vibratory flow meter 5 is that the flow meter 5 in some embodiments can be operated at higher frequencies, if desired. This may be done where no multi-phase flow is expected. For example, if the flow meter 5 is installed downstream of a separator device, then the flow fluid may be acceptably uniform and free of entrained foreign material. In such a situation, the flow meter 5 may be operated at higher frequencies, such as at a second, third, or fourth bending mode, et cetera, where the higher order bending modes comprise multiples or harmonics of the meter resonant frequency, for example.

In embodiments, the vibratory flow meter 5 can be operated at multiple vibrational frequencies. The multiple vibrational frequencies can include vibrating the flow meter assembly 10 at alternating frequencies or at different frequencies at different times. Alternatively, the flow meter assembly 10 can be simultaneously vibrated at multiple vibrational frequencies.

Multiple mass flow measurements obtained at different resonant or off-resonance frequencies can be compared to determine whether a multi-phase flow exists and to determine a multi-phase error magnitude. For example, if mass flow measurements obtained at 10, 20 and 30 Hz are substantially identical, but a mass flow measurement obtained at 40 Hz significantly deviates from the previous measurements, then it can be determined that multi-phase errors are occurring somewhere above the 30 Hz vibrational frequency, and a multi-phase indication can be generated.

The drive frequency is the frequency at which the one or more flow conduits 103A and 103B are vibrated in order to measure flow characteristics of the flow fluid. The drive frequency can be selected to be at a flow fluid resonant frequency, for example, or can comprise one or more resonant frequency harmonics, higher bending mode frequencies, or off-resonant frequencies above or below the resonant frequency. Therefore, the drive frequency can differ from a vibrational response frequency and can vary according to the makeup of the flow fluid. In addition, the drive frequency is affected by the stiffness characteristic of the flowmeter. As the stiffness characteristic increases, the drive frequency will increase. As a result, lowering the flow conduit stiffness will result in a lower flow conduit resonant frequency. The flow conduit stiffness can be changed in a variety of ways, as discussed below.

The very low frequency or very high frequency capabilities of the flow meter 5 can be achieved through appropriate design parameters. The basic consideration in producing the vibratory flow meter 5 is that the meter's effective bending mode stiffness can be changed in order to modify the operating frequency and/or resonant (or natural) frequency. The change in meter stiffness can be achieved in any manner and it is not important how the meter stiffness change is accomplished. However, several likely ways are discussed below.

A factor in meter stiffness is a flow conduit length. The flow meter length is substantially correlated to meter stiffness, wherein increasing the meter length will translate to some decrease in meter stiffness and operational frequency. Consequently, the flow meter length can be chosen in order to achieve at least some meter stiffness change.

A factor in meter stiffness is a flow conduit aspect ratio. For purposes of this discussion, the flow meter aspect ratio is defined as a flow meter height (H) divided by the flow meter length (L), where the aspect ratio=(H/L) (see FIG. 2). Where the height (H) is less than the length (L), the height-to-length aspect ratio (H/L) will be less than one. Where the flow meter is a straight flow meter, the height-to-length aspect ratio (H/L) will be effectively zero. Where the height (H) is greater than the length (L), the height-to-length aspect ratio (H/L) will be greater than one. For example, in the flow meter 5 of FIG. 2, the height-to-length aspect ratio (H/L) will be significantly larger than one and can reach a relatively high number. As a consequence, the height-to-length aspect ratio (H/L) can be increased in order to reduce meter stiffness and can be reduced in order to increase meter stiffness.

Some flow meter manufacturers use an opposite convention comprising a length-to-height (L/H) aspect ratio. A straight tube flow meter under such a convention would have a length-to-height aspect ratio that would approach infinity, rendering this aspect ratio convention to be relatively unhelpful.

A factor in meter stiffness is a flow conduit material. The flow conduit material can be selected in order to increase or decrease the meter stiffness.

A factor in meter stiffness is flow conduit thickness. The flow conduit thickness can be changed in order to modify the meter stiffness. However, as a practical matter, substantial reductions in flow conduit thickness can result in a reduced pressure capability and in an inadequate durability or ruggedness.

A factor in meter stiffness is a flow conduit shape. The flow conduit shape can be modified in any desirable fashion, including using conduits of substantially round, elliptical, rectangular, irregular, or other suitable shapes.

A factor in meter stiffness is a flow conduit geometry. The flow conduit geometry can be affected in any desirable fashion, including the use of appropriate straight and curved sections, for example. For example, a U-shaped flow conduit has a lesser stiffness than a straight conduit flow meter of the same length.

A factor in meter frequency is a flow conduit mass. The resonant frequency of the flow meter assembly 10 will drop as the flow conduit mass is increased, with all other factors being unchanged. The flow conduit mass can be increased or decreased in any fashion. For example, flow conduit mass can be increased through the addition of counterweights or other masses, for example. Adding mass at a discrete point or location will decrease the operational frequency without increasing flow conduit stiffness.

Figure 6:
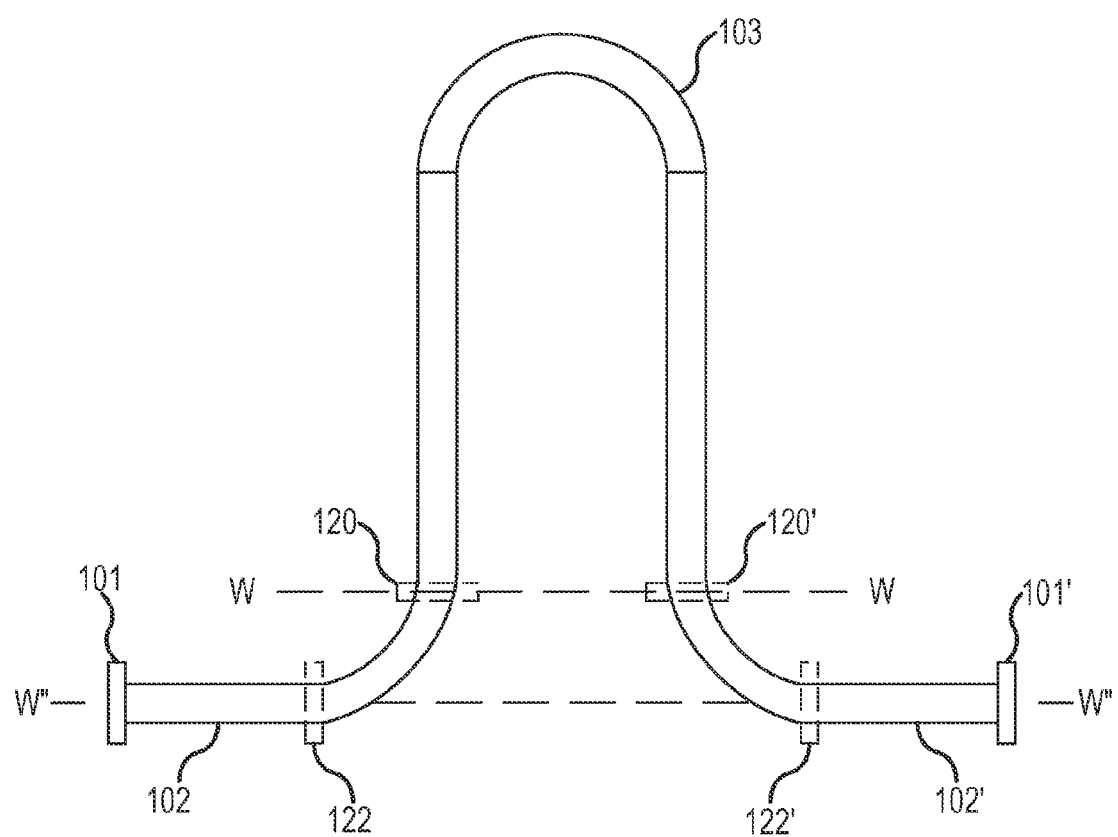
FIG. 6 shows a portion of the very low frequency vibratory flow meter according to the invention.

A factor in meter stiffness is a flow conduit nodal restrictor and vibrational node locations. The flow meter assembly 10 can include one or more nodal restrictors that control a vibration node position and bending axis and therefore affect the vibrational response. A common nodal restrictor in the embodiment shown comprises the spacer 106 in combination with the manifolds 102 and 102'. Alternatively, in other embodiments the nodal restrictor can comprise one or more brace bars that extend rigidly between the two flow conduits at a defined point substantially near to the flanges 101 and 101' (i.e., substantially at the two ends of the flow meter 5). Other node positions are shown in FIG. 6. The one or more nodal restrictors are included in order to fix the vibrational nodes of the curved flow conduits 103A and 103B, creating desired bending axes. The one or more nodal restrictors can be positioned (or removed) in order to increase the length of the flow conduits that experience the vibration or can be located so as to reduce the length of a vibrating portion of the flow conduits 103A and 103B. In FIG. 6, the torsion of sections 102 and 102' also reduces bending mode stiffness and thus reduces frequency.

Figure 2:
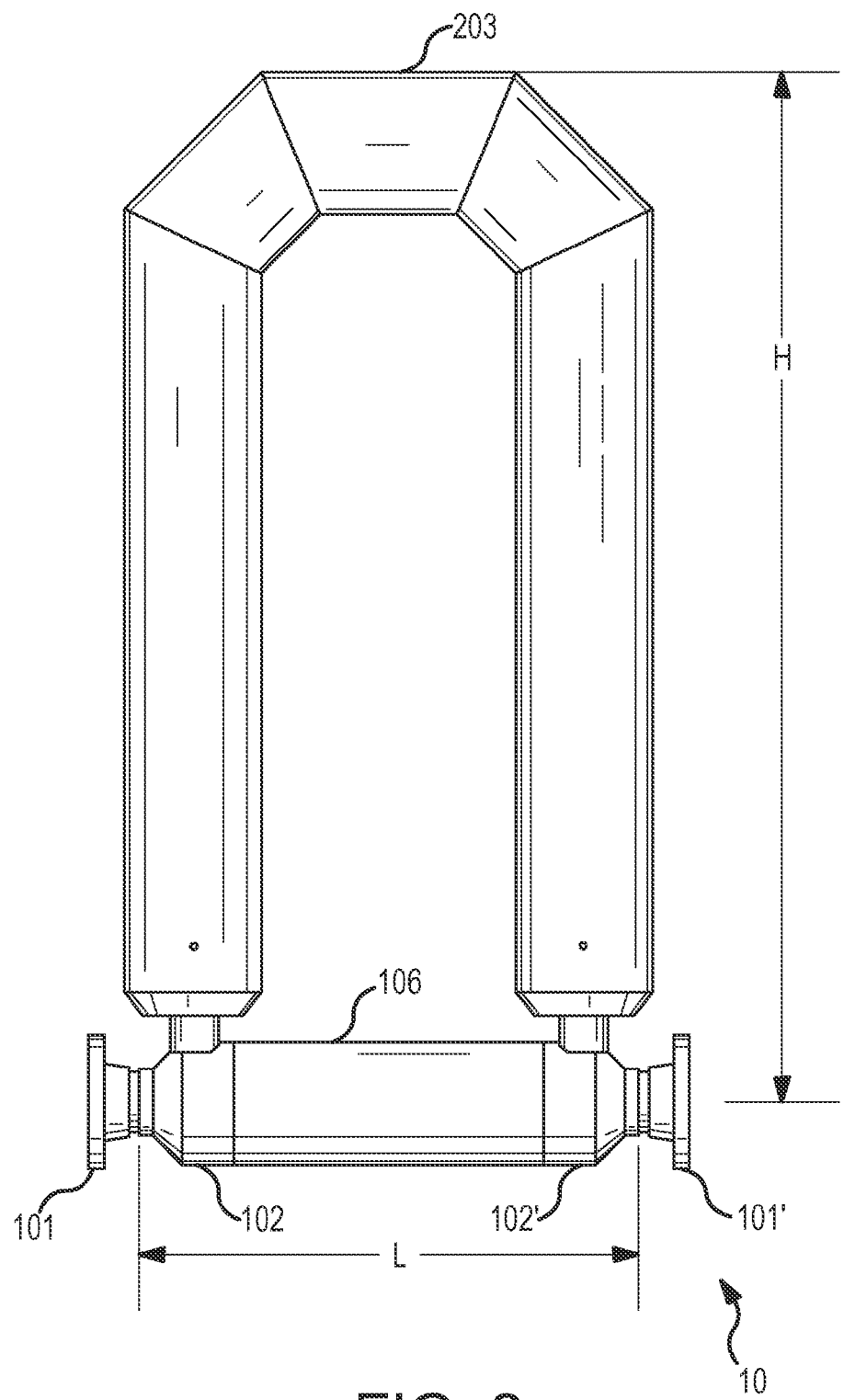
FIG. 2 shows a very low frequency vibratory flow meter according to an embodiment of the invention.

FIG. 2 shows a very low frequency vibratory flow meter 5 according to an embodiment of the invention. The flow conduits 103A and 103B can be within a casing 203, as shown. The casing 203 can protect the flow conduits 103A and 103B and can further function to contain leakage in the event of a flow conduit fault or failure. The vibratory flow meter 5 includes a height H and a length L. It can be seen from the figure that the height H in this embodiment is significantly greater than the meter length L. The height-to-length aspect ratio (H/L) is the ratio of these two meter characteristics. The height-to-length aspect ratio (H/L) may be increased in order to reduce the frequency or alternatively may be reduced in order to increase the frequency. The height-to-length aspect ratio (H/L) may be changed to any needed number, including a number much larger or smaller than one, for example.

In one embodiment, the meter overall length L is substantially the distance between the flanges 101 and 101' of the flow meter 5, while the meter overall height H is substantially the distance between a centerline of the inlet/outlet manifolds 102 and 102' and the farthest away centerline (i.e., the center of the peak of the bowed portion). The aspect ratio is therefore an approximate quantification of the overall shape and size of the flow meter 5. A high aspect ratio (H/L) according to this definition connotes that the flow meter has a large height H compared to its length L.

It should be understood that the aspect ratio can alternatively be defined as length-to-height (L/H). According this alternate definition, the flow meter of this figure will have a very low aspect ratio.

Figure 3:
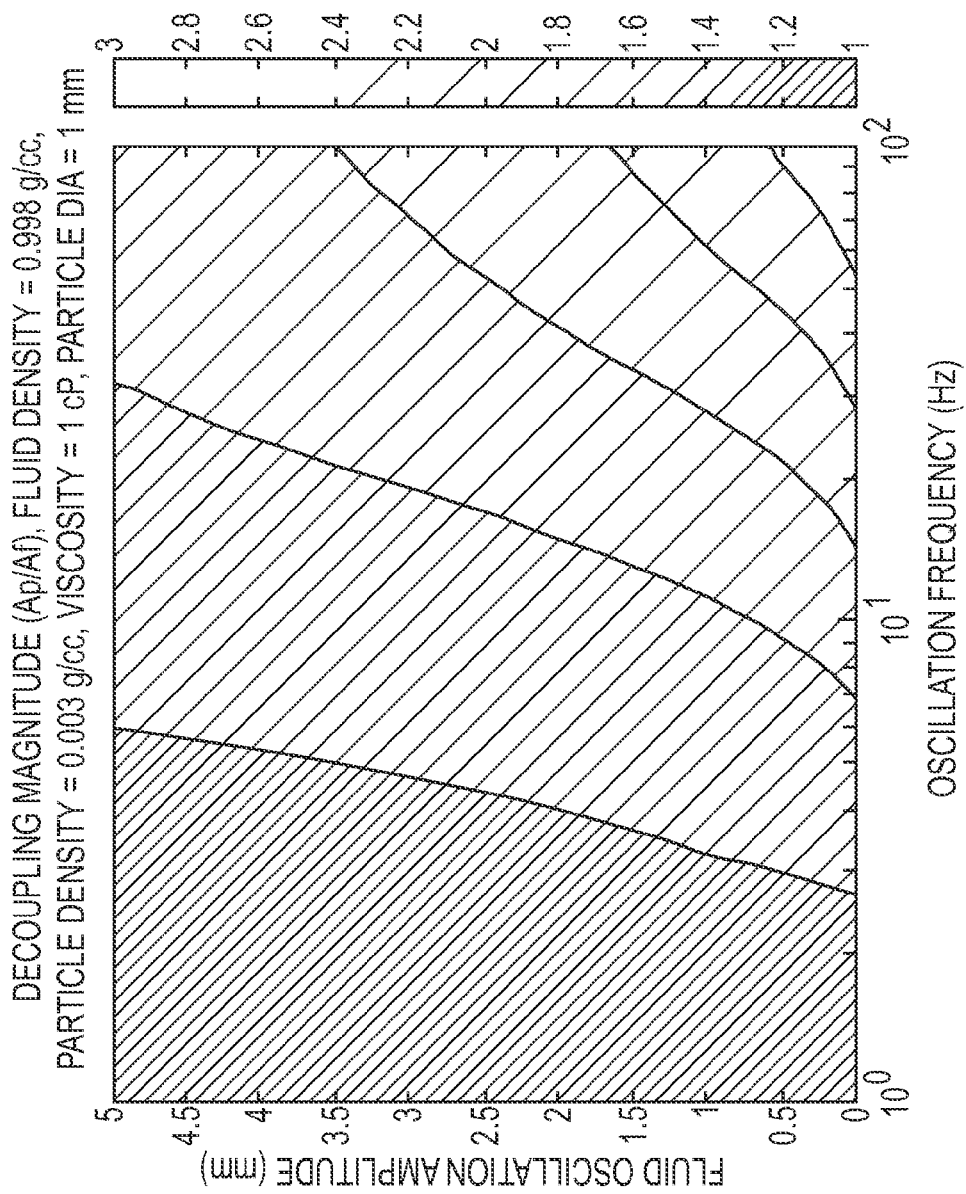
FIG. 3 is a graph of decoupling effect versus frequency for very low operating frequencies up to 100 Hz in the example shown in the graph.

FIG. 3 is a graph of decoupling effect versus frequency for very low operating frequencies up to 100 Hz in the example shown in the graph. The graph shows the decoupling effect versus frequency for a range of vibrational amplitudes. A flow meter operating at less than about 5 to 10 Hz will function desirably because the decoupling ratio will remain at a decoupling ratio of about 1:1, i.e., almost no decoupling will occur. For a very low vibration frequency of 5 Hz or less, it can be seen that the response decoupling magnitude $(A_p/A_f)$ will remain in the darkest region along the left axis of the graph, at around the 1:1 decoupling ratio, as indicated by the scaling bar along the right side of the graph. It can also be seen that the decoupling effect decreases for high vibration amplitudes. As a result, entrained gas bubbles will move with the flow fluid, causing no errors in mass flow or mixture density measurements. Velocity of sound effects will also be negligible for such a low frequency, as SOS/compressibility effects typically do not become apparent until the vibrational frequency exceeds about 200 Hz.

Figure 4:
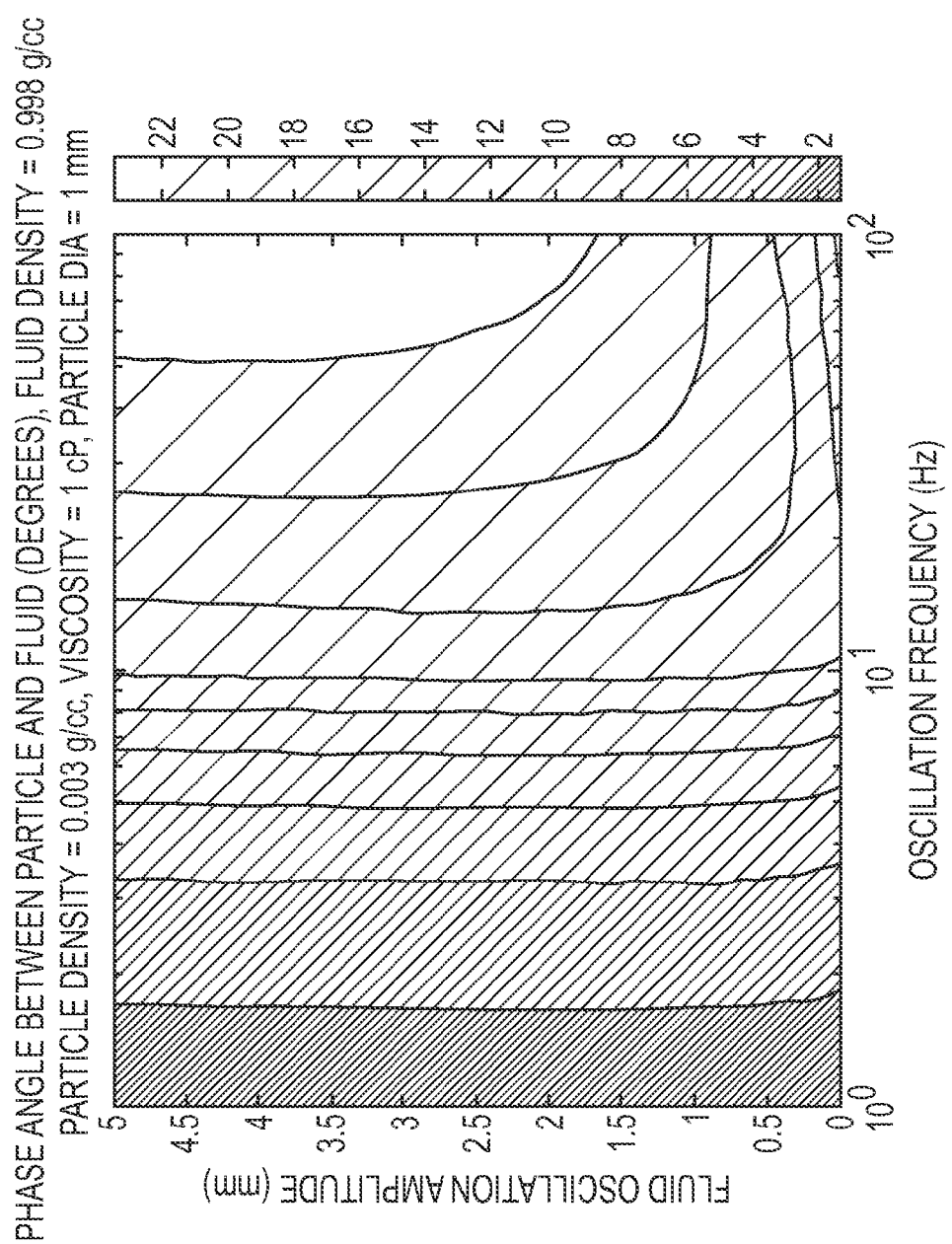
FIG. 4 is a corresponding graph of decoupling phase angle ($\phi$) versus frequency for very low operating frequencies up to 100 Hz in the example shown in the graph.

FIG. 4 is a corresponding graph of decoupling phase angle ($\phi$) versus frequency for very low operating frequencies up to 100 Hz in the example shown in the graph. It can be seen from this graph that the decoupling phase angle ($\phi$) remains low when the vibrational frequency does not exceed 5 Hz.

Regardless of fluid oscillation amplitude, particle size, fluid density, particle density, and fluid viscosity, the relative motion between the particle and fluid is non-existent for a very low oscillation frequency. The amplitude ratio (i.e., the decoupling ratio $(A_p/A_f)$) approaches a 1:1 ratio and the decoupling phase angle ($\phi$) approaches zero. Therefore, there is no need to calculate the decoupling ratio $(A_p/A_f)$ or the decoupling phase angle ($\phi$). Further, the result is independent of the process fluid and the piping arrangement. The meter generates accurate and reliable measurements because there is no relative motion between multi-phase components. This is true for slurries, bubbly fluids, emulsions, or any other multi-density composite fluid.

A vibratory flow meter such as described above could also be driven in its second, third, or fourth bending modes, without limitation. As discussed above, decoupling worsens with increasing frequency. Therefore, more and more negative error will appear in the density measurement as the operating frequency increases. Consequently, the vibratory flow meter can be operated off-resonance.

This fact can be useful as a diagnostic. The meter can be configured to determine whether measurements are affected by SOS or decoupling effects, and at what frequencies the effects become negligible. For example, a flow meter can be driven simultaneously on and off resonance at frequencies of 10, 20, 30, 40, 50, 60, 70, 80, 90, and 100 Hz. For a given flow fluid, measurements at 10, 20, and 30 Hz may all be equivalent, indicating that SOS/decoupling effects do not impact measurements below about 40 Hz. If more gas is entrained or bubble size increases, it may be that only the measurements at 10 and 20 Hz are equivalent, meaning that the decoupling is worse than in the example above and a lower frequency measurement is required. This diagnostic capability can be used to determine the presence of multiple phases or can be used to give the user an indication of the accuracy of the measurements at each frequency.

A primary application of a very low frequency vibratory flow meter may be an upstream (pre-separator) oil and natural gas measurement. Such a multi-phase meter would eliminate the need for a separator, an extremely expensive device. A vibratory flow meter which worked with +/−5% accuracy in this difficult application would be very desirable to the oil and gas community, who want to measure the rough output of each oil well. Another application is in mixing and/or metering cement, where the cement contains rock particles and entrained gas, making it a three phase mixture. With no relative motion between any of the phases at low frequency, the meter would perform as though there was one homogeneous phase and give correct mixture mass flow and mixture density measurements, regardless of the number of components or phases.

While it is possible to drive a meter off-resonance at low or high frequency, the feasibility of a very low frequency vibratory flow meter driven on-resonance may in some respects depend on how long the conduits would have to be in order to reach the desired very low frequency. As an example, for a Micro Motion model E200 Coriolis flow meter that typically vibrates at a seventy Hz frequency for measuring water, the flow conduits extend about eighteen inches past the brace bar. As an estimate, consider the equation for frequency of a fixed-free cantilever beam:

$$f = \frac{3.52}{2\pi}\sqrt{\frac{EI}{ml^4}} \quad (3)$$

Where E is the Modulus of Elasticity, I is the moment of inertia of the cross-section, m is the mass per unity length, and l is the length. For a frequency f of seventy Hz and a length (L) of eighteen inches, a proportionality constant can be found for the (EI/m) component. As an example, a flow conduit must be about sixty-seven inches in length for an E200 model Micro Motion Coriolis flow meter in order to achieve a 5 Hz vibrational frequency, without changing the E, I, or m terms.

Another approach is a combination of the previously discussed factors. For example, one solution would be to lengthen the conduits somewhat, decrease wall thickness somewhat, and add a little mass near the driver or pickoffs and/or operate above or below resonance. Another effective method to reduce frequency would be to allow the conduits to bend into line with the pipeline before the brace bars or event to eliminate the brace bars. This would decrease the stiffness in the drive mode considerably due to an additional torsion component (see FIG. 5).

The very low frequency vibratory flow meter 5 can be designed for a specific application. The flow meter 5 can therefore have a very low operating frequency that achieves a predetermined very low vibrational frequency and very low vibrational response frequency and very high vibrational response amplitude.

The vibrational frequency can be specified in multiple ways. The vibrational frequency can be specified as a frequency threshold or limit. The vibrational frequency can be specified as being below a predetermined decoupling threshold or limit. The vibrational frequency can be specified as being below a predetermined SOS/compressibility threshold or limit. The vibrational frequency can be specified as complying with a predetermined inverse Stokes number threshold or limit (discussed below). For example, the predetermined inverse Stokes number threshold can be chosen to substantially eliminate multi-phase errors.

Coriolis mass flow meters and vibratory densitometers require that the flow fluid move with the flow conduits during oscillation at the meter's natural frequency. When foreign material is introduced, this assumption is no longer valid, as there is relative motion or decoupling between the two or more phases. A model has been developed to predict the conditions that are needed for a good mixture density measurement, given specific meter operating conditions. The fluids model, which has been validated experimentally, can predict decoupling effects. The equations to find a decoupling ratio ($A_p/A_f$) and a decoupling phase angle ($\phi$) are:

$$m_p \frac{dv}{dt} = F_{drag} + F_{history} + F_{addedmass} + F_{buoyancy} \quad (4)$$

The decoupling ratio ($A_p/A_f$) comprises the ratio of the particle (i.e., foreign material) amplitude ($A_p$) versus the flow conduit amplitude ($A_f$). The particle can comprise any foreign material, including gas bubbles, solid particles, or even portions of a different fluid entrained within the flow fluid. The individual terms of equation (4) are defined as:

$$F_{drag} = 6\pi\mu_f a(u-v)\phi(Re) \quad (5)$$

$$F_{history} = 6\pi\mu_f a\left(\frac{u-v}{\delta} + \frac{\delta t_v}{2}\frac{d(u-v)}{dt}\right) \quad (6)$$

$$F_{addedmass} = \frac{2}{3}\pi\rho_f a^3\left(\frac{du}{dt} - \frac{dv}{dt}\right) \quad (7)$$

$$F_{buoyancy} = \frac{4}{3}\pi\rho_f a^3 \frac{du}{dt} \quad (8)$$

The motion of the flow fluid is assumed to match the motion of the flow conduit. The motion of the bubble or particle is calculated as:

FluidVelocity=$u=A_f\cos(\omega t)$ (9)

ParticleVelocity=$v=A_p\cos(\omega t+\phi)$ (10)

The above equations can be used to find particle motion in the oscillating environment of a vibratory flow meter to within about plus or minus ten percent accuracy for the vibrational amplitude and phase difference in most situations.

The six inputs needed to solve the above equations for bubble motion are: the vibrational response frequency (f), the vibrational response amplitude ($A_f$), the fluid density ($\rho_f$), the particle density ($\rho_p$) of the foreign material particles entrained in the flow fluid, the flow fluid dynamic viscosity ($\mu_f$), and the particle size distribution (a) of the foreign material entrained in the flow fluid. The vibrational response frequency (f) and the vibrational response amplitude ($A_f$) can be determined from the vibrational response of the one or more flow conduits (103A, 103B), such as from the vibrational response signal generated by the pick-offs (105, 105'). The fluid density ($\rho_f$) may be specified by a customer, such as in the case of a known flow fluid, or can be obtained by measurement. The particle density ($\rho_p$) may be specified by a customer or alternatively may be determinable from the ideal gas law in the case of entrained gas, given a measured temperature and pressure of the flow fluid. The dynamic viscosity ($\mu_f$) may be specified by a customer, such as in the case of a known flow fluid, or can be obtained by measurement. The particle size distribution (a) may be specified by a customer, such as in the case of a known flow fluid, or can be obtained by measurement, including acoustic or radiation measurements of foreign material particles or bubbles in the flow fluid.

Figure 5:
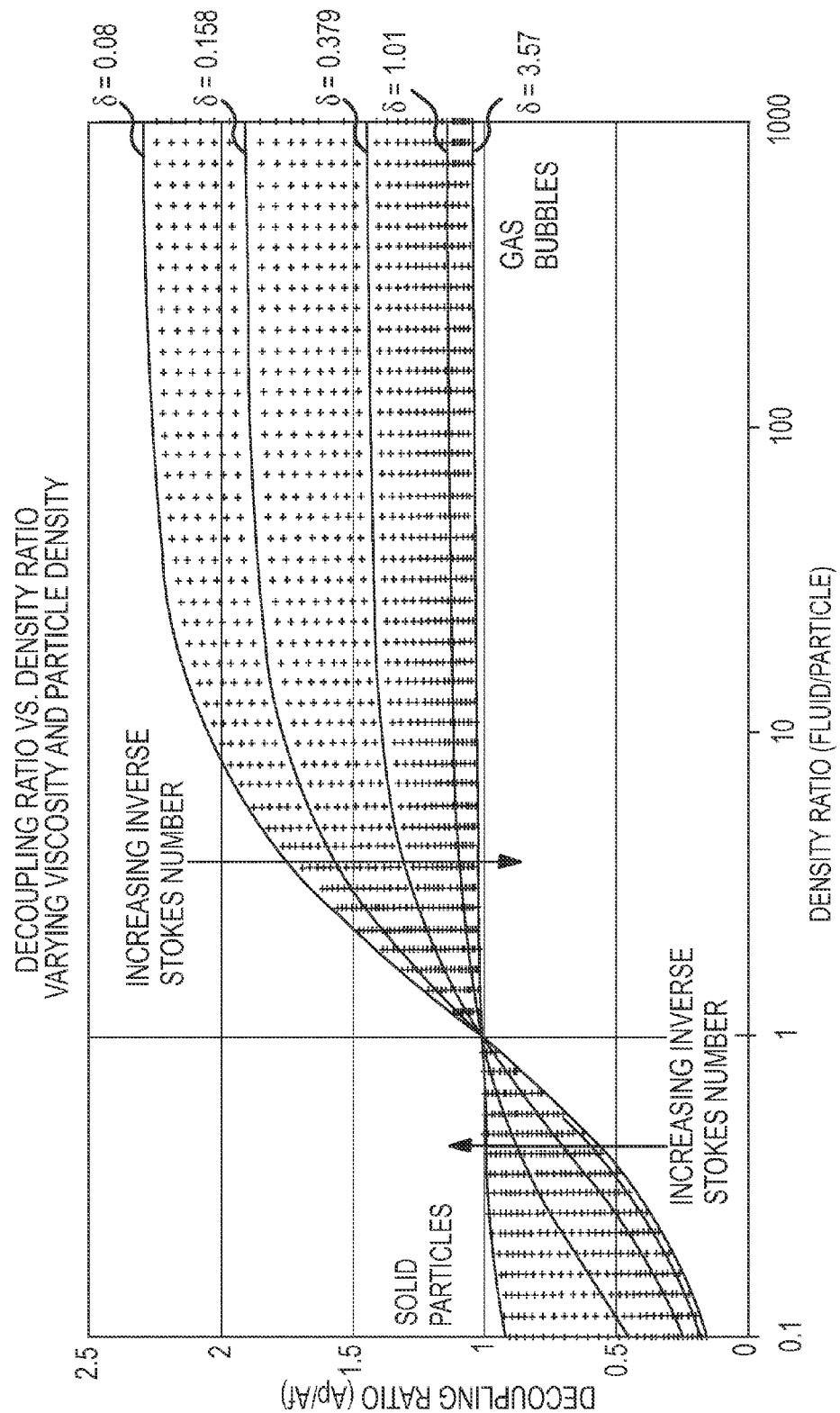
FIG. 5 is a graph of decoupling ratio versus density ratio for the very low or very high frequency vibratory flow meter according to the invention.

FIG. 5 is a graph of decoupling ratio versus density ratio for the very low or very high frequency vibratory flow meter 5 according to the invention. The graph further includes results for various inverse Stokes numbers ($\delta$). The inverse Stokes number ($\delta$) can be used to more succinctly characterize the conditions for avoiding frequency-related decoupling and SOS/compressibility effects.

The graph shows five different inverse Stokes numbers ($\delta$) and the resulting decoupling ratios. It can be seen from the graph that entrained gas and entrained solids react oppositely in terms of decoupling, with the entrained gases exhibiting greater motion than the bulk fluid and solid particles exhibiting less motion. Regardless, the ideal situation is when all phases inside the flow conduit move at exactly the same amplitude and phase (i.e., where $A_p/A_f=1$). It can also be seen that as gas bubble size increases, the amount of decoupling increases. Solid particle decoupling also moves away from the ideal case of 1:1 motion when solid particle size increases.

The inverse Stokes number ($\delta$) comprises:

$$\delta = \sqrt{\frac{2\eta}{\omega a^2}} \tag{11}$$

Where the inverse Stokes number ($\delta$) takes into account the flow fluid kinematic viscosity ($\eta$), the vibrational frequency ($\omega$) in radians, and the particle or bubble radius (a), in meters of the foreign material. The kinematic viscosity ($\eta$) comprises the dynamic viscosity ($\mu$) divided by the density ($\rho$) of the fluid, i.e., $\eta=\mu/\rho$. The foreign material can include entrained gas or entrained solids, as previously discussed. The inverse Stokes number ($\delta$) therefore may be used to more completely and accurately determine upper or lower vibrational frequency limits than is possible through just a frequency specification.

Increasing the inverse Stokes number ($\delta$) moves the decoupling ratio ($A_p/A_f$) closer to unity, indicating a reduction in relative motion. As the density ratio increases past about 50, the decoupling ratio is dependent primarily on the inverse Stokes number ($\delta$). This is especially important because all gas/liquid mixtures have high density ratios, usually above 100. Thus, for the most common multi-phase flow conditions in a vibratory flow meter, the extent of measurement error depends primarily on the inverse Stokes number ($\delta$). If the inverse Stokes number ($\delta$) is very small, the result approaches the inviscid case of a 3:1 decoupling ratio, while if the parameter is large, relative motion is restricted and the decoupling ratio approaches 1:1. The inverse Stokes number ($\delta$) illustrates that the balance between fluid kinematic viscosity, particle size, and frequency is important, not any one of these variables alone. However, frequency is controlled by meter design characteristics, while viscosity and particle or bubble size depend on complex and often uncontrollable process conditions.

The inverse Stokes number ($\delta$) in some very low vibrational frequency embodiments comprises a number above about 3.5. The inverse Stokes number ($\delta$) in some very low vibrational frequency embodiments comprises a number above about 1.0. The inverse Stokes number ($\delta$) in some very low vibrational frequency embodiments comprises a number above about 0.5.

For the purpose of operating a vibratory flow meter at a high vibrational frequency with regard to decoupling effects, the inverse Stokes number ($\delta$) can be used to determine whether the very high vibrational frequency is high enough. The inverse Stokes number ($\delta$) in some very high vibrational frequency embodiments comprises a number lower than about 0.1. The inverse Stokes number ($\delta$) in some very high vibrational frequency embodiments comprises a number lower than about 0.01.

In some embodiments, the vibratory flow meter 5 can be designed to operate at a very low vibrational response frequency of up to about 5 Hz. In some embodiments, the vibratory flow meter 5 can be designed to operate at a very low vibrational response frequency of up to about 10 Hz. In some embodiments, the vibratory flow meter 5 can be designed to operate at a very low vibrational response frequency of up to about 20 Hz. In some embodiments, the vibratory flow meter 5 can be designed to operate at a very low vibrational response frequency of up to about 30 Hz. In some embodiments, the vibratory flow meter 5 can be designed to operate at a very low vibrational response frequency of up to about 40 Hz. In some embodiments, the vibratory flow meter 5 can be designed to operate at a very low vibrational response frequency of up to about 49 Hz. Desired bending mode frequencies may be reached through meter design considerations, or alternatively through off-resonant vibration at a specified lower or higher frequency.

In some embodiments, the vibratory flow meter 5 can be designed to operate at a vibrational response amplitude above about 1 mm. In some embodiments, the vibratory flow meter 5 can be designed to operate at a vibrational response amplitude above about 2 mm. In some embodiments, the vibratory flow meter 5 can be designed to operate at a vibrational response amplitude above about 5 mm. In some embodiments, the vibratory flow meter 5 can be designed to operate at a vibrational response amplitude above about 10 mm.

FIG. 6 shows a portion of the very low frequency vibratory flow meter 5 according to the invention. This figure shows the flow meter 5 employing a large height-to-length aspect ratio (H/L) according to some embodiments of the invention. The large height-to-length aspect ratio (H/L) lowers the flow meter stiffness and the flow meter operating frequency.

In addition, the figure shows a change in the vibrational node positions. The dashed lines in the figure show typical brace bars 120 and 120'. Brace bars are commonly employed to fix bending nodes and establish a bending axis. Brace bars fix the flow conduits in relation to each other, where two flow conduits are employed, and form a vibrational bending node. The brace bars 120 and 120' establish a bending axis W-W, where only the flow conduit portions above the bending axis W-W are allowed to vibrate. The bending axis W-W restricts the vibrational frequency and typically keeps the frequency high.

In order to modify the operating frequency, the bending axis location can be moved. Consequently, the operating frequency can be reduced by an appropriate bending axis location, such as by appropriately locating vibrational node positions. In some embodiments, this can be accomplished by moving the brace bars, as shown by brace bars 122 and 122' in the figure. The brace bars 122 and 122' establish the bending axis W"-W". In other embodiments, this can be accomplished by eliminating the brace bars altogether. In such embodiments, the bending axis can be determined by the flanges 101 and 101' or can be accomplished by the manifolds 102 and 102'. It should be noted that these are only two possible methods for lowering frequency through flow conduit geometry modifications. Other methods are contemplated and are within the scope of the description and claims.

A consequence of a multi-phase flow fluid is that accurate fluid measurements are affected and impeded during such multi-phase periods. The multi-phase effects may be present even in the presence of moderate to mild multi-phase flow conditions. The nature of the multi-phase flow fluid can manifest in compressibility/speed of sound (SOS) effects and in decoupling effects between components of the multi-phase flow fluid. The two effects can be controlled or eliminated by proper selection of vibrational frequency and amplitude.

The multi-phase flow fluids can include entrained gases, especially bubbly gas flows. The multi-phase flows can include entrained solids or entrained solid particles, mixtures such as concrete, slurries, etc. Further, multi-phase flows can include liquids of different densities, such as water and petroleum components, for example. The phases may have different densities, or viscosities.

In a multi-phase flow, the vibration of a flow conduit does not necessarily move the entrained gases/solids completely in phase with the flow fluid. This vibrational anomaly is referred to as decoupling or slippage. Gas bubbles, for example, can become decoupled from the flow fluid, affecting the vibrational response and any subsequently derived flow characteristics. Small bubbles typically move with the flow fluid as the flow meter is vibrated. However, larger bubbles do not move with the flow fluid during vibration of the flow conduit. Instead, the bubbles can be decoupled from the flow fluid and can move independently, with entrained gas bubbles moving farther and faster than the flow fluid during each vibrational movement. This adversely affects the vibrational response of the flowmeter. This is also true of solid particles entrained in the flow fluid, where the solid particles are increasingly likely to decouple from the motion of the flow fluid at increasing vibrational frequencies. The decoupling may even occur where the multi-phase flow includes liquids of differing densities and/or viscosities. The decoupling action has been found to be affected by various factors, such as the viscosity of the flow fluid and the difference in density between the flow fluid and the foreign material, for example.

The size of the bubbles can vary, depending on the amount of gas present, the pressure of the flow fluid, temperature, the degree of mixing of the gas into the flow fluid, and other flow properties. The extent of the decrease in performance is not only related to how much total gas is present, but also to the size of the individual gas bubbles in the flow. The size of the bubbles affects the accuracy of the measurement. Larger bubbles occupy more volume, leading to fluctuations in the density and measured density of the flow fluid. Due to the compressibility of a gas, the bubbles can change in mass yet not necessarily change in size. Conversely, if the pressure changes, the bubble size can correspondingly change, expanding as the pressure drops or shrinking as the pressure increases. This can also cause variations in the natural or resonant frequency of the flow meter.

In a vibrating conduit, the acceleration of the vibrating conduit causes the bubbles to move. The conduit acceleration is determined by the vibrational frequency and the vibrational amplitude. In the case of entrained gas, the bubbles are accelerated in the same direction as the conduit acceleration. The bubbles move faster and further than the flow conduit. The faster bubble motion (and resulting fluid displacement) causes some of the fluid to move more slowly than the flow conduit, causing a net shift in the center of gravity of the fluid mixture backwards from the center of the vibrating conduit. This is the basis of the decoupling problem. As a result, flow rate and density characteristics are under-reported (negative flow and density errors) when entrained air is present.

Slurries present a similar problem. In the case of slurries, however, the solid particles are often heavier than the liquid component. Under the acceleration of the vibrating conduit, the heavier particles move less than the liquid. But because the heavy particles move less, the center of gravity of the fluid mixture still moves slightly backwards from the center of the conduit. This again results in negative flow and density errors.

In the gas-liquid, solid-liquid, and liquid-liquid cases, the differential motion of the entrained phase is driven by the difference in density between the entrained phase and the liquid component. If the compressibility of the gas is neglected, then the same equations can be used to describe the behavior of all three scenarios.

Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. At a very low vibrational frequency, the flow fluid will act as a very viscous fluid, i.e., as if the viscosity is infinite. At a very high vibrational frequency, the flow fluid will act as a non-viscous fluid, i.e., as if the viscosity is approximately zero.

Viscosity is a measure of the resistance of a fluid which is being deformed by either shear stress or extensional stress. In general, it is the resistance of a liquid to flow, a quantification of the fluid's thickness. Viscosity may be thought of as a measure of fluid friction. All real fluids have some resistance to stress, but a fluid which has no resistance to shear stress is known as an ideal fluid or inviscid fluid.

Another influence on bubble mobility is the bubble size. The drag on a bubble is proportional to the surface area, whereas the buoyant force is proportional to the volume. Therefore, very small bubbles have a high drag to buoyancy ratio and tend to move with the fluid. Small bubbles subsequently cause small errors. Conversely, large bubbles tend not to move with the fluid and result in large errors. The same holds true for solid particles, as small particles tend to move with the fluid and cause small errors.

Another problem caused by vibration is speed of sound (SOS) or compressibility effects. These effects make mass flow and density measurements increasingly inaccurate for gassy flows as the vibrational frequency increases.

The density difference is another factor. A buoyant force is proportional to the difference in density between the fluid and the gas. A high pressure gas can have a high enough density to affect the buoyant force and reduce the decoupling effect. In addition, large bubbles occupy more volume, leading to true fluctuations in the density of the flow fluid. Due to the compressibility of a gas, the bubbles can change in gas quantity and yet not necessarily change in size. Conversely, if the pressure changes, the bubble size can correspondingly change, expanding as the pressure drops or shrinking as the pressure increases. This can also cause variations in the natural or resonant frequency of the flow meter and variations in the actual two-phase density.

Second order factors also can have an effect on bubble and particle mobility. The turbulence in a high flow rate fluid can break large gas bubbles into smaller ones, thus reducing decoupling error. Surfactants reduce the surface tension of bubbles and decrease their tendency to coalesce. Valves can decrease bubble size through increased turbulence while pipeline elbows can increase bubble size by forcing them together through centrifugal force.

As a result of careful meter design, the vibratory flow meter 5 can be operated at very low frequencies or at very high frequencies. A very low frequency operation will result in a gas decoupling or a solids decoupling being maintained at about a decoupling ratio of 1:1, where the foreign material in the multi-phase flow fluid moves substantially with the flow fluid. In addition, the very low frequency operation will result in flow characteristics similar to a flow in which the viscosity is very high.

This is true whether the foreign material comprises gas, liquid, or solid components. This is true whether the foreign material is of a moderately different density than the flow fluid or whether the foreign material has a greatly differing density. As a consequence, the entrained foreign material will not substantially affect the measurements performed by the flow meter 5 and the flow meter 5 will produce satisfactorily accurate and reliable measurements. Further, the vibratory flow meter 5 will operate consistently and predictably regardless of gas void fraction (GVF) and/or solids fraction, while being able to satisfactorily measure the flow fluid even as the composition of the multi-phase flow fluid varies. Further, by operating the flow meter 5 at a very low frequency, no compressibility effects will be encountered because transverse acoustic modes appear at much higher frequencies.

A very high frequency operation will result in a gas decoupling ratio being maintained at about a decoupling ratio of 3:1. A very high frequency operation will result in a solids decoupling ratio being maintained at about a decoupling ratio of $3/(1+(2*\rho_p/\rho_f))$. In addition, the very high frequency operation will result in flow characteristics similar to a flow in which the viscosity is effectively zero.

The meter electronics 20 generates a drive signal to the drive 104 and so can be configured to drive/vibrate the flow meter assembly 10 at the very low frequency or at the very high frequency. As is common practice in vibratory flow meters, this entails the meter electronics 20 generating a drive signal of a predetermined frequency and amplitude, wherein the predetermined frequency and amplitude can be affected and modified by feedback taken from the pickoff signals. For example, the drive signal can be controlled according to the feedback in order to achieve a resonant (i.e., natural) frequency in the vibrational response as measured by the pickoff sensors 105 and 105'.

The meter electronics 20 can be configured to generate the very low or very high frequency in various ways. The meter electronics 20 can be configured during manufacture, such as by appropriately programming a memory of the meter electronics 20. Alternatively, the meter electronics 20 can be configured with the frequency during a calibration process, for example, where the frequency programming in some embodiments may depend on the measured or determined meter stiffness as determined by the calibration process. In another alternative, the frequency can be derived or determined during a meter start-up operation. For example, the frequency can be based on pre-stored or user entered values. This may include, for example, a frequency that is based on pre-stored or user-entered information regarding the nature of the multi-phase flow fluid.

Decoupling worsens with increasing frequency, up to a maximum of about a 3:1 decoupling ratio for gases, where the gas in a worst case scenario will move about three times the distance traversed by the liquid component during vibration. The liquid component moves primarily with the flow conduit. For a solid particle, the worst case is a decoupling ratio of about 0:1, where the solid particle is substantially stationary during conduit oscillation. This occurs when the frequency is high and the particle density is high.

Decoupling is, in general, a complicated function of many input parameters, which makes it very difficult to compensate for in flow meter measurements. However, it has been found that the decoupling effect is negligible for small gas bubbles. Similarly, where the flow fluid is highly viscous, the decoupling may not occur or may only occur with very high vibrational frequencies. Further, in an entrained gas scenario, if the foreign material is mixed well with the flow fluid, decreasing the bubble size and/or evenly distributing the gas, then the decoupling can be reduced or effectively eliminated in some cases. Also, a high flow fluid viscosity reduces or eliminates decoupling and increases measurement accuracy. However, the characteristics of the flow fluid may be fixed in nature and the bubble size and viscosity may have to be accepted as-is.

A very low frequency vibratory flow meter can be designed to be immune from multi-phase effects, including both SOS/compressibility effects and decoupling effects. Of course, where the volume of entrained foreign material gets large enough, even a very low frequency vibratory flow meter may suffer some effects, but a very low frequency flow meter will still exhibit much greater accuracy and reliability than moderate or high frequency prior art vibratory flow meters.

Figure 7:
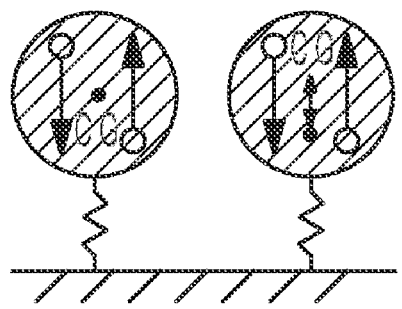
FIG. 7 shows a simple free body diagram that illustrates the source of errors in multi-phase flow in vibratory flow meters.

FIG. 7 shows a simple free body diagram that illustrates the source of errors in multi-phase flow in vibratory flow meters. Consider two fluid parcels of equal density and size switching places due to turbulent induced fluid mixing during an oscillation of the flow tubes, as shown on the left side of the figure.

Because the densities of the fluid particles are equal in the single phase scenario of the left flow conduit, no change in the location of the center of gravity (CG) occurs and the natural frequency of the system is unaffected. However, in multi-phase mixtures, as shown in the right flow conduit of the figure, the two fluid parcels or particles that switch places during an oscillation are of different densities, causing a change in the location of the CG of the tube. For example, if a bubble moves further than the tube on each oscillation, then some fluid must move in the opposite direction to fill the void left by the bubble. This must be the case because a constant bubble size and mass and an incompressible liquid phase are assumed.

When the particle density differs from the fluid density, additional forces such as the added mass and drag forces cause a particle motion that is relative to the fluid on each oscillation. These forces act in the same direction on every particle, causing non-random displacements that are coordinated with each oscillation cycle. Consequently, a change in the location of the CG of the tube occurs according to the drive frequency.

Figure 8:
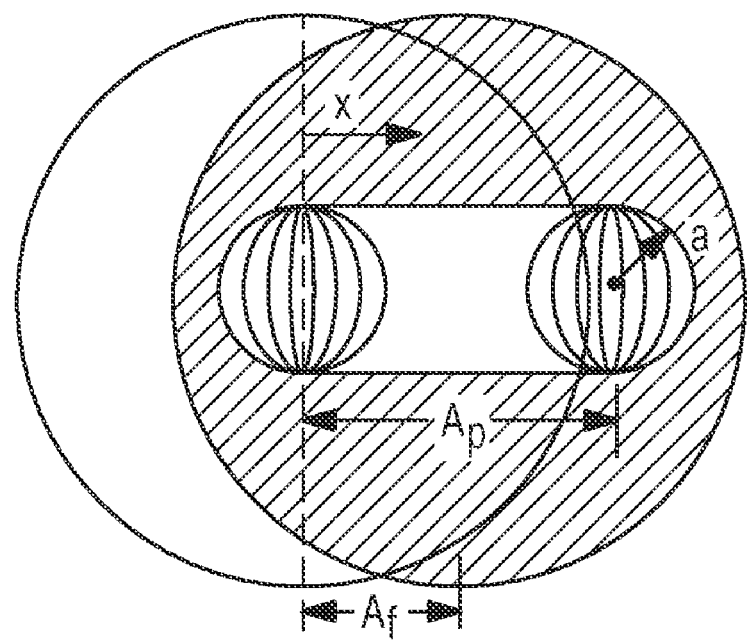
FIG. 8 depicts the motion of a relatively light particle of radius a inside a tube of a vibratory flow meter filled with a denser flow fluid.

FIG. 8 depicts the motion of a relatively light particle of radius a inside a tube of a vibratory flow meter filled with a denser flow fluid. The particle moves a total distance of $A_p$ relative to a stationary inertial frame, with each quarter oscillation of the tube from midline to peak. This relative motion is defined as $A_p - A_f$ because the tube moves forward by $A_f$ during each quarter oscillation.

When a bubble moves too far forward in the fluid during an oscillation, some quantity of fluid must backfill the vacated volume. This causes a change in the location of the CG. The change in CG location can be calculated in terms of meter and fluid parameters to determine, for example, the expected density measurement error for a vibratory flow meter with multi-phase flow. The same exercise can be done for mass flow, although decoupling as a function of length along the flow conduit must then be considered. Several assumptions are made in the following derivation of density error due to decoupling. The particle motion in an oscillating fluid medium is well defined by an amplitude ratio and phase angle, however it is only possible to derive an analytic expression for density error due to decoupling in a flow meter using a CG approach, when the phase angle between the particle and fluid is assumed to be zero. The assumption of zero phase angle is perfectly met for the case of an infinitely viscous fluid or an inviscid fluid, for example when the flow conduit is vibrated at very low or very high frequency, respectively. For other scenarios, the phase angle is usually less than twenty degrees, so a good first approximation of density error for the range of meter and fluid parameters found for a vibratory flow meter is expected. A constant tube volume, particle size, and particle mass during oscillation are also assumed. These assumptions are well met for any foreign material inclusion type, regardless of the inclusion density.

Figure 9:
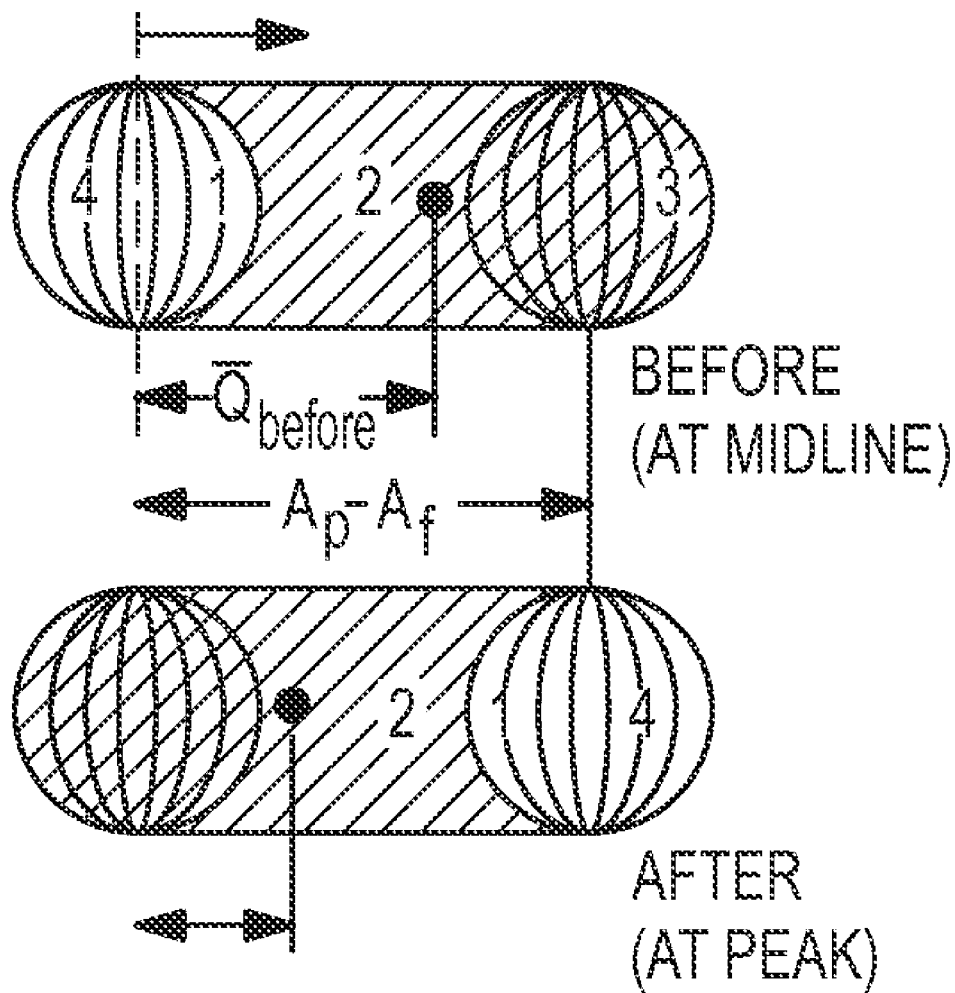
FIG. 9 shows a total relative motion between the particle and fluid on a single quarter oscillation of the flow tube, including the change in location of the center of gravity (CG).

FIG. 9 shows a total relative motion between the particle and fluid on a single quarter oscillation of the flow tube, including the change in location of the CG. The movement of the CG due to decoupled motion of particles in an oscillating flow tube can be calculated. The movement of the CG causes a measurement error which depends on the densities of the components and how far the particles decouple. The path of a particle moving relative to the fluid traces out a three-dimensional cylinder with hemispheres of radius a at both ends.

The total volume of particle and fluid affected by the motion of the particle relative to the fluid on a quarter oscillation is defined as follows.

$$\text{Liquid Volume Displaced} = (A_p - A_f)(\pi a^2) \quad (12)$$

$$\text{Particle Volume Displaced} = \frac{4}{3}\pi a^3 \quad (13)$$

The above expressions are multiplied by respective densities to find the mass of each component displaced. Working in terms of mass allows for arbitrary fluid and particle densities.

$$\text{Liquid Mass Displaced} = \rho_f(A_p - A_f)(\pi a^2) \quad (14)$$

$$\text{Particle Mass Displaced} = \rho_p\left(\frac{4}{3}\pi a^3\right) \quad (15)$$

Using FIG. 9, the location of the CG of each of the particle and liquid components is calculated before and after oscillation.

FIG. 10 gives the locations of the CG of the particles and of the liquid components, referenced from the dotted line in FIG. 9 to the CG of each component, labeled (1) to (4). Note the negative sign included in the calculation of the first mass $m_1$ (1). This is required because this mass is to be subtracted from the fluid cylinder (2), which is otherwise full of fluid.

The total mass of the composite that moves is defined by:

$$M = \sum m_i = \pi a^2 \rho_f (A_p - A_f) + \frac{4}{3}\pi a^3 \rho_p \quad (16)$$

The CG of the displaced fluid before the particle moves from zero to peak is defined as follows:

$$\overline{Q}_{before} = \frac{\sum m_i \overline{q}_i}{\sum m_i}$$

$$= \frac{\frac{2}{3}\pi a^3 \rho_f (A_p - A_f) + \frac{1}{2}\pi a^2 \rho_f (A_p - A_f)^2}{\pi a^2 \rho_f (A_p - A_f) + \frac{4}{3}\pi a^3 \rho_p} \quad (17)$$

The CG of the displaced fluid after the particle moves from zero to peak is defined as follows:

$$\overline{Q}_{after} = \frac{-\frac{2}{3}\pi a^3 \rho_f (A_p - A_f) + \frac{1}{2}\pi a^2 \rho_f (A_p - A_f)^2 + \frac{4}{3}\pi a^3 \rho_p (A_p - A_f)}{\pi a^2 \rho_f (A_p - A_f) + \frac{4}{3}\pi a^3 \rho_p} \quad (18)$$

The total distance that the CG moves in the relative reference frame can be found by subtracting equation (17) from equation (18).

$$\Delta \overline{Q} = \overline{Q}_{after} - \overline{Q}_{before} \quad (19)$$

$$= \frac{\frac{4}{3}\pi a^3 \rho_p (A_p - A_f) - \frac{4}{3}\pi a^3 \rho_f (A_p - A_f)}{\pi a^2 \rho_f (A_p - A_f) + \frac{4}{3}\pi a^3 \rho_p}$$

The expression can be simplified in order to more clearly expose the important parameters.

$$\Delta \overline{Q} = \frac{\left(1 - \frac{\rho_f}{\rho_p}\right)(A_p - A_f)}{1 + \frac{3}{4a}\left(\frac{\rho_f}{\rho_p}\right)(A_p - A_f)} \quad (20)$$

If the density ratio is exactly unity ($\rho_f/\rho_p=1$), as for a single phase fluid, then there can be no change in location of the CG. If the bubbles are vanishingly small, then $A_p=A_f$, and there can be no change in location of the CG. In the limit of small density ratio ($\rho_f/\rho_p \ll 1$), as for the case of a heavy solid particle in a fluid of negligible density, the change in location of the CG reduces to $-A_f$ because $A_p$ approaches zero, as required by the model. In this case, the particle is so heavy that it remains stationary in the inertial reference frame while the fluid moves around it. Finally, for the case of a massless particle in a liquid, the density ratio approaches infinity ($\rho_f/\rho_p \to \infty$) and the change in location of the CG depends only on particle size, $\Delta Q = -4a/3$.

The composite mass M defined by equation (16) experiences the shift in CG ($\Delta Q$) defined by equation (19) on each oscillation. This knowledge of the motion of the CG does not immediately yield an expression for density measurement error. Instead, a fictitious mass that is stationary in the inertial frame during each oscillation of the flow tube is determined so as to produce the same overall motion of the CG. It may then be assumed that this stationary mass of fluid is absent from the density measurement because its motion is entirely decoupled from the tube motion. As a result, the natural frequency of the system increases, and in the case of a vibrating densitometer, negative density error results.

From the perspective of a stationary observer in the inertial frame, a single phase fluid of mass ($m_f$) in the tube of a vibratory flow meter has momentum (p) defined by the mass of the fluid multiplied by the sinusoidal tube velocity, giving ($p=m_f A_f \omega \cos(\omega t)$). From the perspective of an observer moving with the tube, the single phase fluid has no momentum because the velocity of the CG of the fluid is exactly zero ($\Delta Q=0$). However, when multiple phases are present, it can be shown that the motion of the CG of the mixture is non-zero with respect to a relative reference frame moving with the tube ($\Delta Q \neq 0$). This results in non-zero momentum in the relative frame. It can be demonstrated that this momentum, caused by decoupling, results in density measurement errors.

The momentum produced by the known mass and motion of the CG (M, $\Delta Q$) is first calculated from the known particle motion. A fictitious stationary mass is then found that produces the same net momentum on each oscillation. Momentum for a composite mass is simply the total mass times the velocity of the CG of the composite. For the case of the decoupled fluid and particle, the CG of mass M displaces by a magnitude ΔQ on each quarter oscillation. Because the motion is assumed to be sinusoidal with angular frequency (ω) and zero phase, the momentum (p) can be defined in terms of the harmonic displacement of the CG.

$$p = M\frac{d}{dt}[\Delta\overline{Q}\sin(\omega t)] = \omega\Delta\overline{Q}M\cos(\omega t) \tag{21}$$

FIG. 9 represents one possible configuration of moving masses over distances which produces the momentum defined in equation (21). However, there are infinite other possible configurations of certain masses moving certain distances that could produce the same net momentum in the relative frame. A configuration that produces the equivalent momentum and that is composed of a mass which remains stationary in the inertial reference frame is desired. This mass is not measured by the vibratory flow meter because it is entirely decoupled from tube motion.

Equation (22) finds the total effective mass of fluid (M'), which would have to be stationary in the inertial frame to produce an equivalent momentum as that produced by equation (21). The $(-A_f)$ term appears because the effective stationary mass is needed in terms of the inertial coordinate system. The CG calculations above have referred to the relative frame with coordinate (q). However, the value of (q) is needed where the CG of the mass is stationary in the inertial frame. Because $(x=q+A_f)$, for a stationary mass it is found that $(x=0)$ and $(q=-A_f)$. This describes the fact that a mass moving a distance $(-A_f)$ in the (q) coordinate system is actually stationary with respect to the inertial frame. Assuming equivalent momentum requires that the stationary mass (M') is defined as follows.

$$M[\Delta\overline{Q}\omega\cos(\omega t)] = M'[-A_f\omega\cos(\omega t)] \tag{22}$$

$$M' = -\frac{M\Delta\overline{Q}}{A_f} \tag{23}$$

$$M' = \frac{4}{3}\pi a^3(\rho_f - \rho_p)\left(\frac{A_p}{A_f} - 1\right) \tag{24}$$

Equation (24) gives the effective stationary mass due to the motion of a single particle of specific radius, with associated decoupling ratio and density. The mass is dependent on the volume of the particle, the density difference, and the extent of decoupled motion. For the more general case of a range of particle sizes and particle densities, the expression for stationary mass requires a summation over each particle in the flow tube. It is assumed that the displacement amplitude of each particle could be different, depending on particle size and particle density. The fluid density and fluid displacement amplitude, however, are assumed to be constant for each particle. Thus, $\rho_f$ and $A_f$ do not need subscripts in the following summation, while any quantities referring to the particle do. Consider a mixture consisting of a bubble and a solid particle suspended in a water-filled tube which is oscillating at amplitude $A_f$. The decoupling ratio $(A_p/A_f)$ is greater than unity for the bubble and less than unity for the solid particle, and thus M' would consist of two separate terms representing the effective loss in mass from the individual decoupled motion of each particle. Assuming there are N particles, each of which has an associated density, radius, and amplitude response, the total effective mass of decoupled fluid M' is given by the equation:

$$M' = \sum_{i=1}^{N}\left[\frac{4}{3}\pi a_i^3(\rho_f - \rho_{p,i})\left(\frac{A_{p,i}}{A_f} - 1\right)\right] \tag{25}$$

If a constant particle density and size are assumed, then equivalent motion is expected for each particle and the subscripts are no longer needed on a, $\rho_p$, or $A_p$. This allows for the removal of the summation of equation (25), yielding:

$$M' = N\frac{4}{3}\pi a^3(\rho_f - \rho_p)\left(\frac{A_p}{A_f} - 1\right) \tag{26}$$

It is recognized that N multiplied by the volume of each particle is simply the total particle volume inside the flow tube. Equation (26) is now divided by the total tube volume, which is the sum of the particle and fluid volumes, yielding:

$$\rho' = \frac{Vol_p}{Vol_p + Vol_f}(\rho_f - \rho_p)\left(\frac{A_p}{A_f} - 1\right) \tag{27}$$

Dividing by a known volume reveals a density quantity from what was previously a mass quantity. The definition of the particle volume fraction, α, is simply the particle volume divided by the total volume. Thus, the effective non-contributing portion of density is defined in terms of the particle volume fraction, α, as in:

$$\rho' = \alpha(\rho_f - \rho_p)\left(\frac{A_p}{A_f} - 1\right) \tag{28}$$

The actual mixture density and the decoupled density are defined in terms of the volume fraction of the dispersed phase, α, yielding:

$$\rho_{actual} = \rho_f(1 - \alpha) + \rho_p\alpha \tag{29}$$

$$\rho_{decoupled} = \rho_f(1 - \alpha) + \rho_p\alpha - (\rho_f - \rho_p)\alpha\left(\frac{A_p}{A_f} - 1\right) \tag{30}$$

Recall that the actual density of the multi-phase fluid in the vibratory flow meter given by equation (29) is the mixture density, not the liquid density. Equation (30) represents the density that would be measured by the vibratory flow meter due to the decoupled motion of the particles. The error from true mixture density due to decoupling can be found by subtracting equation (29) from equation (30), yielding:

$$\rho_{error} = \rho_{decoupled} - \rho_{actual} = -(\rho_f - \rho_p)\alpha\left(\frac{A_p}{A_f} - 1\right) \tag{31}$$

Alternatively, the density error can be expressed in percent form, which allows for better comparison between widely varied fluid densities.

$$\rho_{error,\%} = 100\left(\frac{\rho_{decoupled} - \rho_{actual}}{\rho_{actual}}\right) \tag{32}$$

$$= 100\left(\frac{-(\rho_f - \rho_p)\alpha\left(\frac{A_p}{A_f} - 1\right)}{\rho_f(1-\alpha) + \rho_p\alpha}\right)$$

Here, the ($\rho_f$) term is the density of the flow fluid, the ($\rho_p$) term is the density of the entrained particles, the ($A_p/A_f$) term is the decoupling ratio, and the ($\alpha$) term is the particle volume fraction (i.e., a particle size or particle size distribution). As a check of these results, consider the extreme cases of a bubble in an inviscid fluid or an infinitely viscous fluid, for which the decoupling ratios are explicitly known. Here a particle density of zero is assumed, although for the infinitely viscous case this is not necessary because the decoupling is eliminated completely for a particle of any density. For an inviscid fluid and mass-less particle, the decoupling ratio is exactly three (i.e., 3:1), and for an infinitely viscous fluid the decoupling ratio is exactly unity. For each of these conditions, equation (30) reduces to the following:

$$\rho_{decoupled,inviscid,bubble} = \rho_f(1-3\alpha) \quad (33)$$

$$\rho_{decoupled,viscous,bubble} = \rho_f(1-\alpha) \quad (34)$$

These results are equivalent to those found in previous works such as *Hemp & Yeung* (2003). The maximum neglected density of two times the void fraction times the fluid density is found for the case of a bubble in an inviscid fluid, while no neglected density is predicted for a bubble in an infinitely viscous fluid. Therefore, if a mixture with 1% gas void fraction is present, the density error is expected to be between 0 and −2%, depending on viscosity, bubble size, meter frequency, and other parameters. It should be noted that this rule of thumb is only valid for particles with negligible mass. For example, if the mass of the particle is greater than the liquid, the magnitude of the density error can actually be greater than twice the particle volume fraction.

According to equation (31), the measured density of a bubbly fluid will be erroneously low because the decoupling ratio is greater than one. This is intuitive, as bubbles move farther through the fluid on each oscillation, causing fluid to move backwards to fill the vacated volume. The result is an apparent density which is less than the true mixture density. Error is also found to be increasingly negative for larger bubbles, as is expected because large bubbles decouple further and increase the non-participating mass. For the case of a dense solid particle in a liquid, the decoupling ratio is less than one and the density difference, $\rho_f - \rho_p$, is negative, causing the last term in equation (30) to be negative, similar to the case of a bubble. This is expected because a solid particle does not move as far as the fluid, so again there is a backward shift in the CG of the tube wherein the heavy component moves less on average than the tube itself.

FIG. 11 is a graph of decoupling density error versus particle density. The fluid is water with 1 cP viscosity, 998 kg/m³ density, and an oscillation frequency and amplitude of 100 Hz and 0.37 mm (0.015 in), respectively. As can be seen in the graph, the density error due to decoupling is always negative, regardless of particle density (except in the case of no decoupling, for which the density error is zero). The no decoupling scenario occurs when the particle is the same density as the fluid or when viscous forces are so high that no relative motion occurs. FIG. 11 is based on equation (32) for the density error, expressed in percent form, assuming no phase angle between the particle and fluid. The density error approaches the theoretical maximum of −2α for mass-less bubbles, although it is limited somewhat by viscous effects. If viscosity were to approach zero, the density error at 0 kg/m³ particle density would approach the expected value of −2%.

The effect of other meter design parameters and fluid properties on density error during multi-phase flow has also been investigated. It is assumed that there is no phase difference between the particle and the fluid. The density error approximation given by equation (32) is employed.

Figure 12:
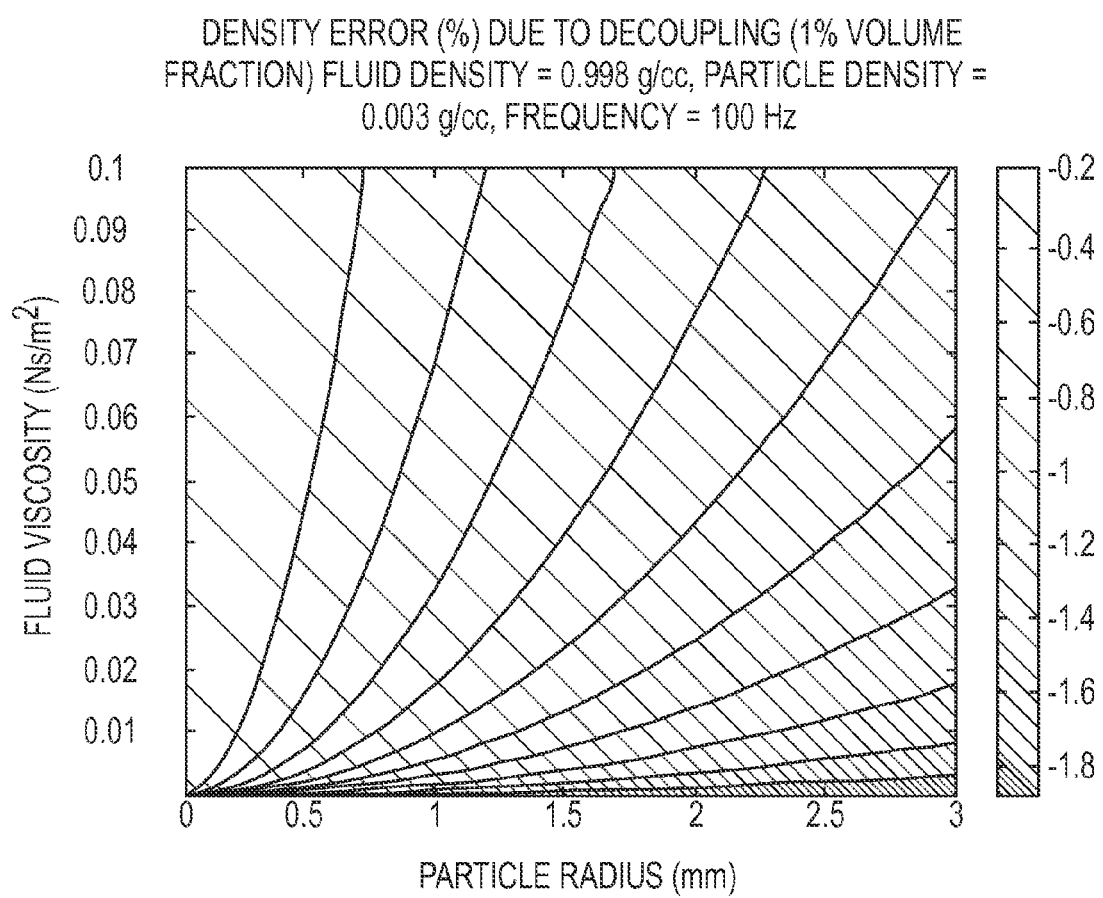
FIG. 12 is a surface plot of density error for fluid viscosity versus particle size.

FIG. 12 is a surface plot of density error for fluid viscosity versus particle size. Density error is controlled primarily by the decoupling ratio rather than the phase angle, as shown in the figure. As expected, density error is minimized for small bubbles in high viscosity fluids and grows with increasing bubble size and/or with decreasing viscosity. Because the particle density is negligible, the results follow a rule of thumb that the density error varies between zero and minus two times the void fraction, depending on parameters such as bubble size and viscosity. For large particles in low viscosity fluids, the nearly inviscid case of −2% density error for 1% gas volume fraction may be reached.

Figure 13:
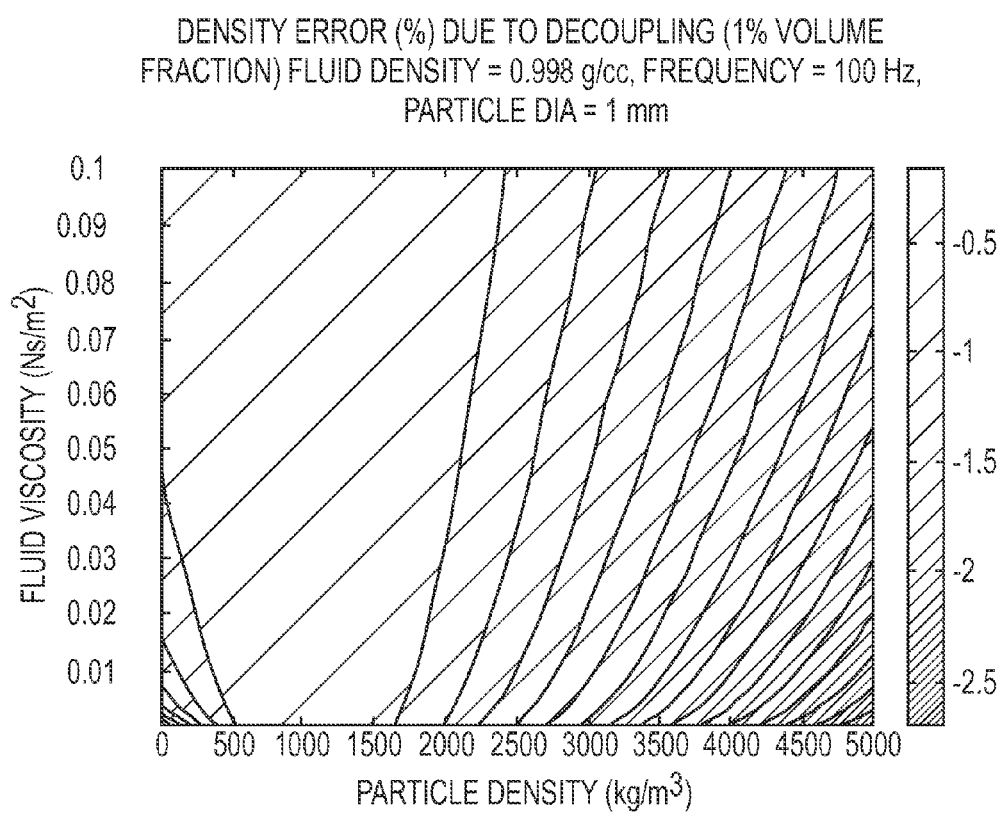
FIG. 13 is a surface plot of density error for fluid viscosity versus particle density.

FIG. 13 is a surface plot of density error for fluid viscosity versus particle density. As expected, errors increase as the fluid-to-particle density ratio deviates from the single phase ratio of 1:1. The most severe density errors result from gas bubbles or highly dense particles in relatively inviscid fluids. For the case of high density particles, note that the magnitude of the density error may exceed two times the particle volume fraction. As particle density increases, the amplitude ratio ($A_p/A_f$) becomes small, meaning that the particle barely moves with each oscillation from the perspective of a laboratory observer. Thus, an increasingly heavy particle is increasingly stationary, causing a large backward movement of the CG of the flow tube and a corresponding large negative density error.

Figure 14:
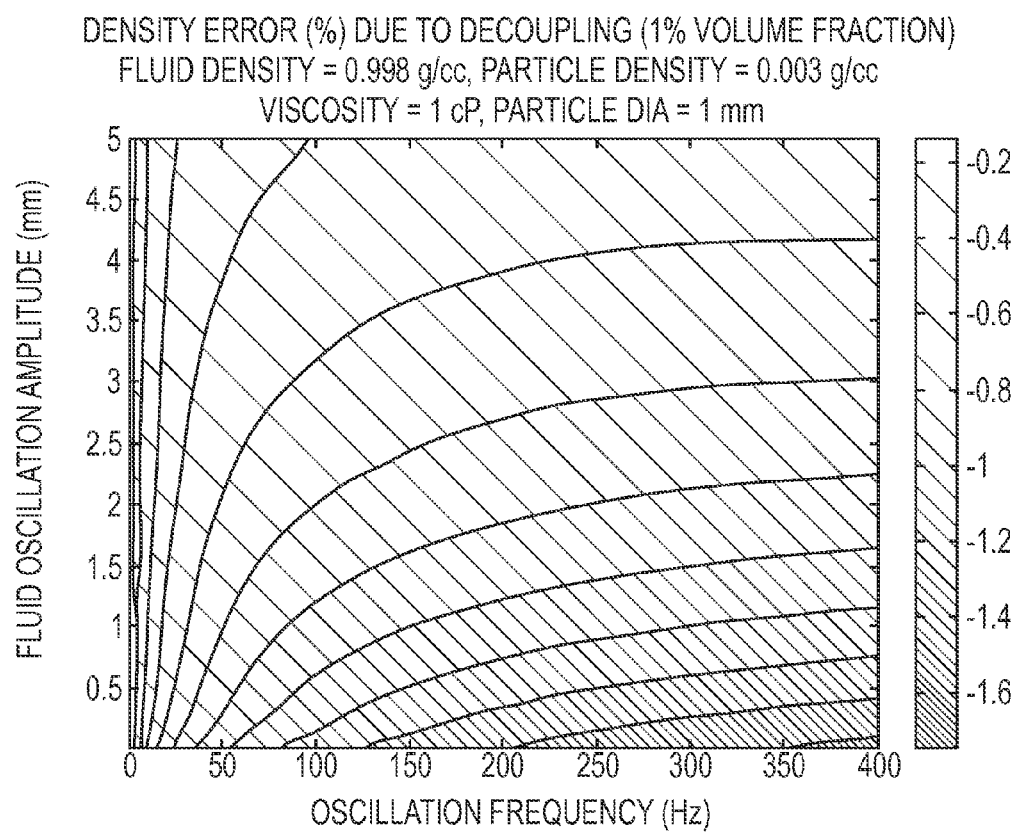
FIG. 14 is a surface plot of density error for conduit amplitude versus vibrational frequency.

FIG. 14 is a surface plot of density error for conduit amplitude versus vibrational frequency. The figure gives density error as a function of meter design parameters. The density error can be minimized by using a very low frequency vibratory flow meter. Additionally, the flow meter can vibrate at a very low amplitude, concurrent with the very low frequency. For example, at a constant tube amplitude of about 0.5 mm, the density error is 0.35% higher for a vibratory flow meter oscillating at 400 Hz than a vibratory flow meter oscillating at 100 Hz, and 0.5% higher for a 1000 Hz meter. At the same amplitude, density error is only −0.4% for a flow meter vibrating at 10 Hz, and error is virtually eliminated for frequencies less than 1 Hz.

A very low vibrational frequency can be achieved by vibrating the flow meter assembly 10 at a first bending mode. The first bending mode comprises a resonant frequency of the flow meter assembly 10, wherein the length of a flow conduit moves in a single direction. A high vibrational frequency can comprise vibrating the flow meter assembly 10 at a second or higher bending mode. At higher bending modes, additional vibration nodes exist on a flow conduit. The conduit portions on either side of this vibrational node move in opposite directions.

In some embodiments, the very high frequency vibratory flow meter 5 can operate at a very high frequency as a result of flow meter design. In some embodiments, the very high frequency vibratory flow meter 5 can operate at a very high frequency as a result of the configuration of a drive signal.

Figure 15:
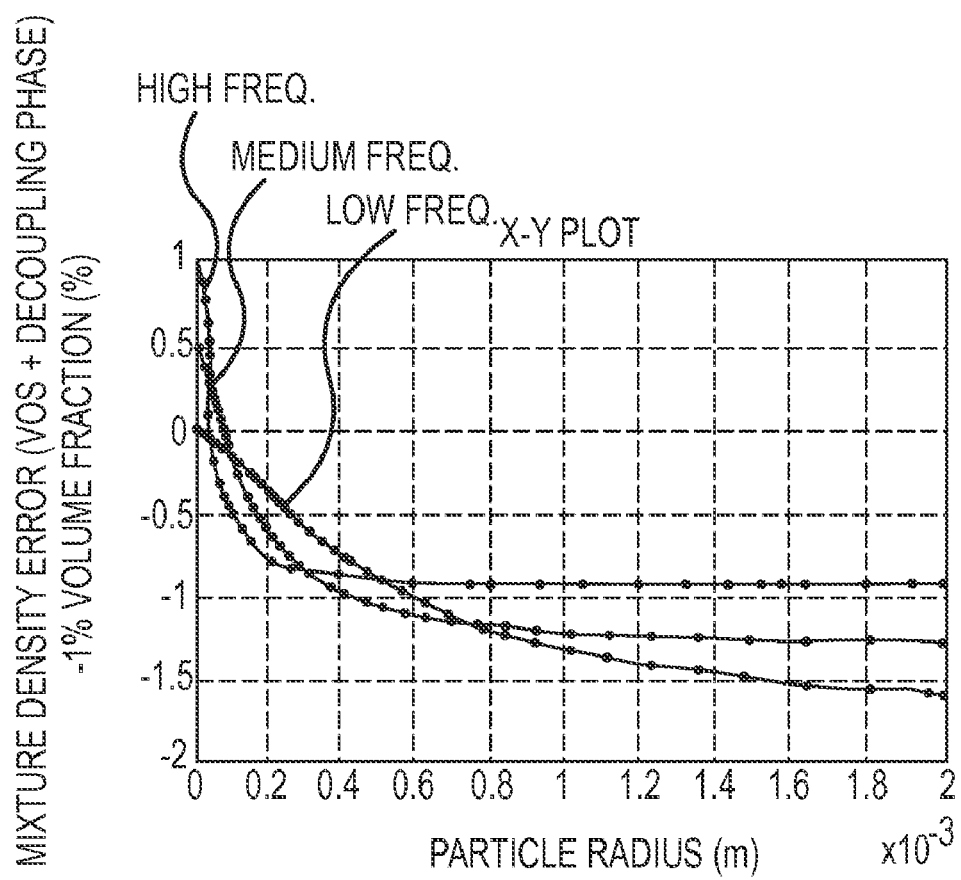
FIG. 15 is a chart that shows simulation results of total density error from a very low frequency mode, a medium frequency mode, and a very high frequency mode of a Coriolis flow meter.

FIG. 15 is a chart that shows simulation results of total density error from a very low frequency mode, a medium frequency mode, and a very high frequency mode of a Coriolis flow meter. It can be seen that at very small particle sizes, any decoupling is negligible, such as where the decoupling ratio ($A_p/A_f$) is approximately one and the density error is correspondingly insignificant. In this small particle scenario, speed of sound (SOS)/compressibility effects dominate. As a result, the medium and high frequency modes have positive errors and the low frequency mode does not have much error at all.

However, when bubbles get bigger than a few tenths of a millimeter in diameter, decoupling effects begin to dominate the SOS/compressibility effects and the error goes negative. Note that as particle size increases, the observed error will asymptotically converge to the inviscid model results, i.e., at an about 3:1 decoupling ratio ($A_p/A_f$). This asymptote happens earlier in terms of bubble size when the oscillation frequency is high. Therefore, if a meter is vibrated at a high enough frequency, then equation (32) can be employed. Equation (32) is independent of bubble size and flow fluid viscosity.

Figure 16:
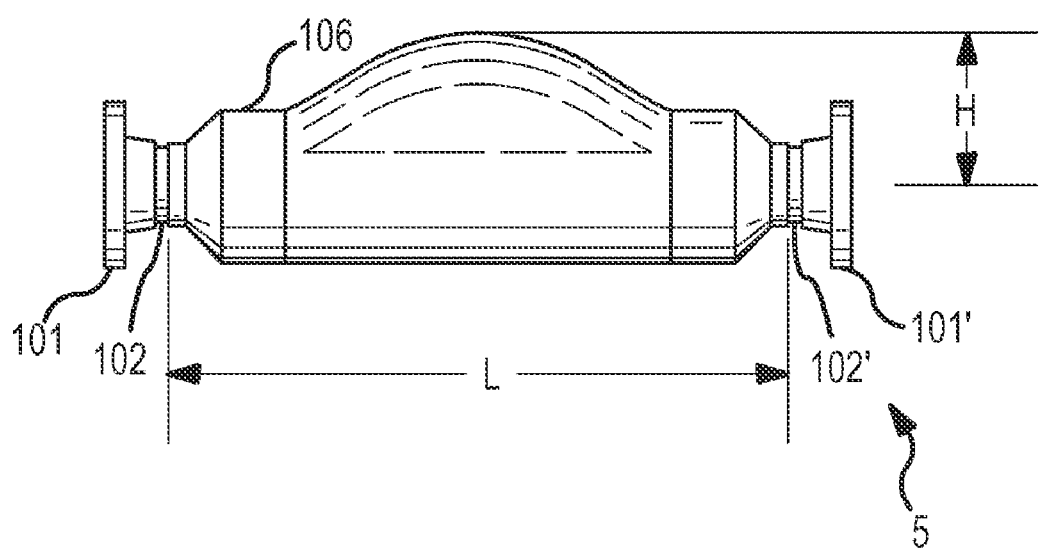
FIG. 16 shows a very high frequency vibratory flow meter according to an embodiment of the invention.

FIG. 16 shows a very high frequency vibratory flow meter 5 according to an embodiment of the invention. The very high frequency can be based on an effective length of the one or more flow conduits 103A, 103B and the geometry of the flow meter 5, as previously discussed. The effective length in some embodiments can be controlled by the flow conduit geometry. In addition, the drive frequency can be further affected by one or more balance masses that can optionally be affixed to the one or more flow conduits 103A, 103B, as needed.

In the figure, the flow meter 5 has a large length L in proportion to a relatively small height H. The very high frequency vibratory flow meter 5 therefore may have a low height-to-length aspect ratio (H/L). For example, a height-to-length aspect ratio (H/L) may be less than or much less than one. Therefore, the very high frequency vibratory flow meter 5 according to the invention is relatively small and therefore easy to accommodate in most metering applications.

In some embodiments, the very high frequency comprises a vibration frequency above 1,500 Hz. In some embodiments, the very high frequency comprises a vibration frequency above 2,000 Hz. In some embodiments, the very high frequency comprises a vibration frequency above 3,000 Hz and beyond. However, it should be understood that the vibration frequency can be at any frequency above these thresholds, as the required very high frequency will ultimately depend on various factors, including the flow fluid composition and the nature of the entrained foreign material, for example.

It should be understood that alternatively both a very low frequency vibratory flow meter and a very high frequency vibratory flow meter can be used together in order to achieve the results discussed herein. For example, two flow meters can measure the flow fluid at different frequencies and the resulting measurement signals can be processed according to various embodiments of the invention. The processing can be performed in the meter electronics of either flow meter, or can be performed in a separate device.

It should be understood that the vibratory flow meter 5, whether configured to be a very low frequency vibratory flow meter or a very high frequency vibratory flow meter, can be operated at multiple vibration frequencies. For example, the vibratory flow meter can be operated at a plurality of frequencies to generate a plurality of vibrational responses, wherein the plurality of vibrational responses are compared in order to determine an approximate onset of multi-phase effects.

Figure 17:
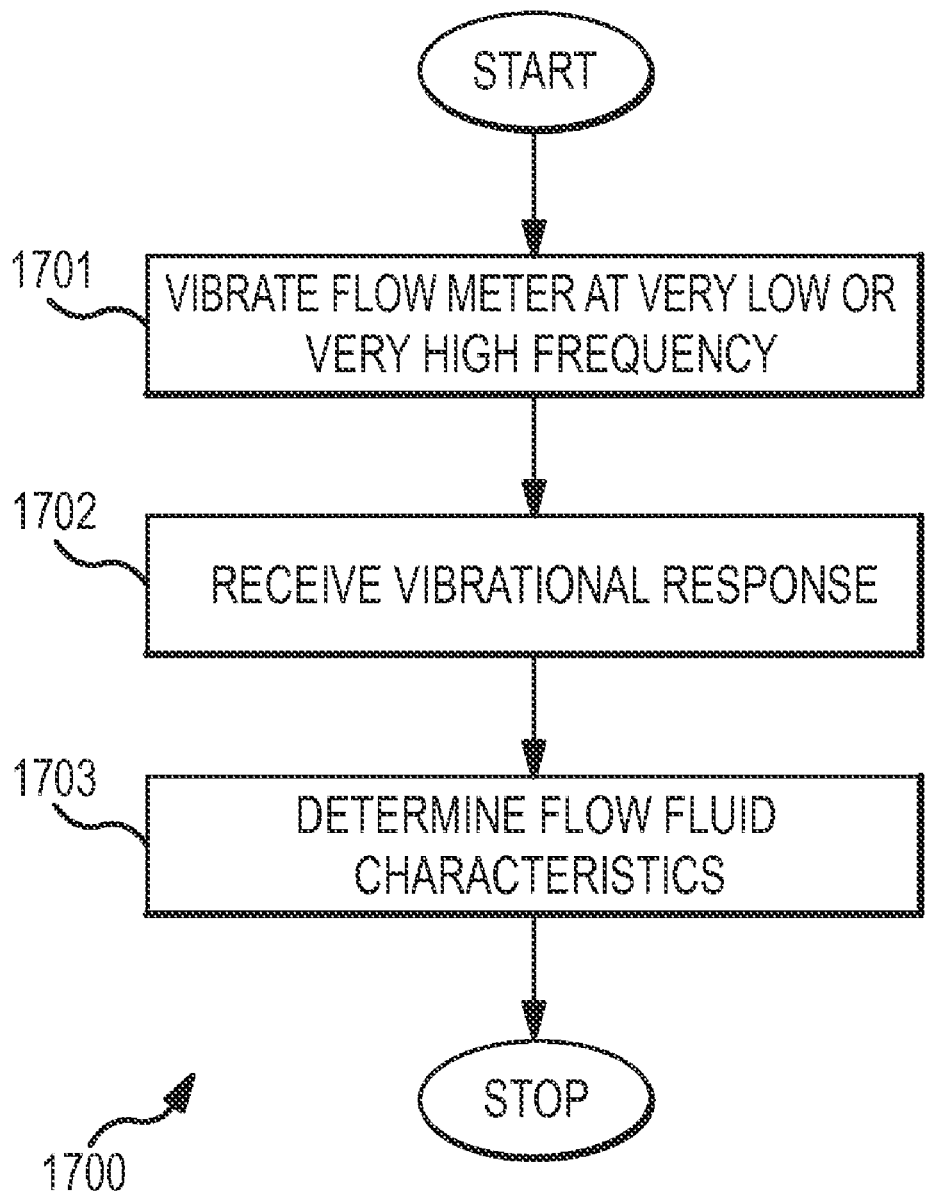
FIG. 17 is a flowchart of a method for determining one or more flow fluid characteristics of a multi-phase flow fluid according to the invention.

FIG. 17 is a flowchart 1700 of a method for determining one or more flow fluid characteristics of a multi-phase flow fluid according to the invention. In step 1701, a vibratory flow meter is operated at one or more very low operating frequencies and one or more very high operating frequencies. The vibratory flow meter can be operated to substantially sequentially vibrate at the multiple frequencies in some embodiments. Alternatively, the vibratory flow meter can be operated to substantially simultaneously vibrate at the one or more very low frequencies and at the one or more very high frequencies.

The one or more very low frequencies and the one or more very high frequencies may be determined based on an expected flow fluid, for example. Alternatively, the one or more very low frequencies and at the one or more very high frequencies may depend at least somewhat on other constraints, such as fluid pressure or available physical space for the meter, for example. Other constraints are contemplated and are within the scope of the description and claims.

For example, entrained gas in the expected flow fluid can cause errors in measurement. Depending on bubble size and flow fluid viscosity, a gassy or bubbly flow fluid at a given vibrational level may exhibit more measurement error than an equivalent entrained solids multi-phase flow. Entrained solids typically do not exhibit compressibility effects and tend to decouple to a lesser extent than bubbles. Consequently, an entrained gas multi-phase flow fluid might require a more extreme frequency or frequencies than an entrained solids multi-phase flow fluid, depending on conditions.

The expected fluid flow can allow for frequency design based on an expected particle or bubble size in the flow, or an expected range of sizes. For example, the vibratory flow meter can be designed in some embodiments to reliably make fluid measurements during two phase flow including small to moderate bubbles/particles. The vibratory flow meter can be designed in some embodiments to reliably measure entrained gas for bubbly flows but not slug flows. Alternatively, with careful design, the vibratory flow meter can be designed to accurately and reliably measure even slug flows. Further, the vibratory flow meter can be designed to accurately and reliably measure multi-phase flow fluids including both bubbles and solids, such as concrete or other cement mixtures, for example.

The determining can further take into account operating constraints of the vibratory flow meter. The operating constraints can include a flow fluid pressure. The operating constraints can be independent of or can include a flow fluid viscosity. The operating constraints can include an expected foreign material type or types. The operating constraints can include an expected foreign material size or sizes. The operating constraints can include an available physical space for the vibratory flow meter.

In step 1702, one or more very low frequency vibrational responses and one or more very high frequency vibrational responses are received. The vibrational responses will be received in response to the very low and very high drive frequencies used to vibrate the flow meter assembly 10.

In step 1703, one or more flow fluid characteristics are determined from the one or more very low frequency vibrational responses and the one or more very high frequency vibrational responses. The one or more flow fluid characteristics can include a mixture mass flow rate ($\dot{m}_{mix}$) and a mixture density ($\rho_{mix}$) that are highly accurate and not substantially affected by multi-phase flow effects. The one or more flow fluid characteristics can further include a fluid mass flow rate ($\dot{m}_f$) and an entrained particle/gas mass flow rate ($\dot{m}_p$) that are accurate and not substantially affected by multi-phase flow effects. The one or more flow fluid characteristics can further include a component fluid density ($\rho_f$) that is accurate and not substantially affected by multi-phase flow effects. The one or more flow fluid characteristics can further include a fluid fraction ($\phi_f$), a particle fraction ($\phi_p$), and a mixture speed of sound ($c_{mix}$). Other additional flow fluid characteristics are contemplated and are within the scope of the description and claims.

The determining may include using a known or assumed value for the decoupling ratio ($A_p/A_f$). At very low frequencies, the decoupling ratio ($A_p/A_f$), whether for entrained gas or entrained solids, can be assumed to be about 1:1. At very high frequencies, the decoupling ratio for entrained gas can be assumed to be about 3:1, while the decoupling ratio for entrained solids can be assumed to be about equal to $3/(1+(2*\rho_p/\rho_f))$.

At very low frequencies, the flow fluid viscosity can be assumed to be approximately infinity. At very high frequencies, the flow fluid viscosity can be assumed to be approximately zero.

As an example, several equations may be used for processing the resulting very low and very high frequency vibrational responses. Equation (35), below, may be applied at any vibration frequency, whether high or low. At very low frequencies, however, the decoupling ratio ($A_p/A_f$) will be one, as previously discussed. As a result, the right hand term in equation (35) is effectively zero, so the density measured by the vibratory flow meter is the actual mixture density ($\rho_{mix}$). As a result of the very low frequency, it is known that this measured mixture density ($\rho_{mix}$) is accurate and reliable. Also, at the very low vibrational frequency, the measured mixture mass flow ($\dot{m}_{mix}$) is also known to be accurate and reliable, as previously discussed.

Equation (35) can also be applied at one or more very high frequencies, such as the examples shown in equations (45)-(46), below. In each case, the decoupling ratio will remain substantially constant—and independent of bubble size, for example—over the one or more very high frequencies (although the SOS term will increase with increasing frequency ($\omega$)).

$$\rho_{meter} - \rho_{mix} = \frac{\rho_{mix}}{4}\left(\frac{\omega(d/2)}{c_{mix}}\right)^2 - (\rho_f - \rho_p)\phi_p\left[\frac{A_p}{A_f} - 1\right] \quad (35)$$

$$\rho_{mix} = \rho_f\phi_f + \rho_p\phi_p \quad (36)$$

$$\varphi_f + \varphi_p = 1 \quad (37)$$

$$\frac{1}{\rho_{mix}c_{mix}^2} = \frac{\phi_f}{\rho_f c_f^2} + \frac{\phi_p}{\rho_p c_p^2} \quad (38)$$

$$\dot{m}_{mix} = \dot{m}_f + \dot{m}_p \quad (39)$$

$$\frac{\dot{m}_{mix}}{\rho_{mix}} = \frac{\dot{m}_f}{\rho_f} + \frac{\dot{m}_p}{\rho_p} \quad (40)$$

In one example, the vibratory flow meter is used to determine one or more flow fluid characteristics of oil from a well, where gas is entrained in the oil. In a worst case scenario, the densities and fractions of the oil and gas are not known or assumed, although the flow fluid pressure and temperature are typically measured or known. The vibratory flow meter is vibrated using at least one very low frequency and at least one very high frequency. The desired flow fluid characteristics commonly include at least a mixture mass flow rate ($\dot{m}_{mix}$) and a mixture density ($\rho_{mix}$). In addition, the (fluid) oil component mass flow rate ($\dot{m}_f$) and density ($\rho_f$) are likely to be desired. This may require or necessitate determining an oil/liquid fraction of the multi-phase flow. The mass flow rate ($\dot{m}_p$) and density ($\rho_p$) of the gas component (where gas bubbles are the entrained particles (p)) may or may not be desired. The (particle/bubble) gas density ($\rho_p$) can be calculated from the ideal gas law $P=\rho_p RT$. However, the fluid density ($\rho_f$) is still needed. Additional vibrations performed at very high frequencies will provide additional equations, enabling the solution of an equivalent number of unknowns. Therefore, where the ($\phi_f$), ($\phi_p$), and ($c_{mix}$) terms are desired, two additional very high frequency vibrations are needed, which will provide the results shown in equations (45) and (46). The two very high frequencies ($\omega_1$) and ($\omega_2$) can comprise any suitable frequencies.

$$\rho_{mix} = \rho_f\phi_f + \rho_p\phi_p \quad (41)$$

$$\varphi_f + \varphi_p = 1 \quad (42)$$

$$\dot{m}_{mix} = \dot{m}_f + \dot{m}_p \quad (43)$$

$$\frac{\dot{m}_{mix}}{\rho_{mix}} = \frac{\dot{m}_f}{\rho_f} + \frac{\dot{m}_p}{\rho_p} \quad (44)$$

$$\rho_{meter,1} - \rho_{mix} = \frac{\rho_{mix}}{4}\left(\frac{\omega_1(d/2)}{c_{mix}}\right)^2 - 2(\rho_f - \rho_p)\phi_p \quad (45)$$

$$\rho_{meter,2} - \rho_{mix} = \frac{\rho_{mix}}{4}\left(\frac{\omega_2(d/2)}{c_{mix}}\right)^2 - 2(\rho_f - \rho_p)\phi_p \quad (46)$$

The use of two or more versions of equation (35), i.e., producing the results shown in equations (45) and (46), enables the elimination of the common SOS term ($c_{mix}$). The resulting two equations can be solved in order to determine the unknowns ($\phi_f$) and ($\phi_p$), Then additional flow fluid characteristics can be derived using equations (41) through (44). Other equations are contemplated and are within the scope of the description and claims.

What is claimed is:

1. A vibratory flow meter (5) for determining one or more flow fluid characteristics of a multi-phase flow fluid, the vibratory flow meter (5) comprising:
    a flow meter assembly (10) including one or more flow conduits (103A, 103B), with the flow meter assembly (10) being configured to generate a very low frequency response that is below a predetermined minimum decoupling frequency for the flow fluid and to generate a very high frequency response that is above a predetermined maximum decoupling frequency for the flow fluid, independent of the foreign material size or the foreign material composition; and
    meter electronics (20) coupled to the flow meter assembly (10) and configured to receive one or more very low frequency vibrational responses and one or more very high frequency vibrational responses and determine the one or more flow fluid characteristics from the one or more very low frequency vibrational responses and the one or more very high frequency vibrational responses.

2. The vibratory flow meter (5) of claim 1, wherein the meter electronics (20) is configured such that a decoupling ratio ($A_p/A_f$) is about 1:1 for the very low frequency and is configured such that a decoupling ratio ($A_p/A_f$) is about 3:1 for entrained gas at the very high frequency and is about equal to $3/(1+(2*\rho_p/\rho_f))$ for entrained solids at the very high frequency.

3. The vibratory flow meter (5) of claim 1, wherein the meter electronics (20) is configured such that a viscosity is effectively infinity with regard to particle motion for the flow fluid at the very low frequency and is configured such that a viscosity is effectively zero with regard to particle motion for the flow fluid at the very high frequency.

4. The vibratory flow meter (5) of claim 1, wherein the very low frequency is below a predetermined minimum SOS/compressibility threshold, independent of a foreign material size or a foreign material composition.

5. The vibratory flow meter (5) of claim 1, wherein the very low frequency vibrational response corresponds to an inverse Stokes number (δ) that is above about 3.5 and wherein the very high frequency vibrational response corresponds to an inverse Stokes number (δ) that is less than about 0.1.

6. The vibratory flow meter (5) of claim 1, wherein the one or more flow conduits (103A, 103B) are configured to achieve the very low frequency and the very high frequency by configuration of one or more of a flow conduit stiffness, flow conduit length, flow conduit aspect ratio, flow conduit material, flow conduit thickness, flow conduit shape, flow conduit geometry, or one or more vibrational node positions.

7. The vibratory flow meter (5) of claim 1, with the vibratory flow meter being configured to operate at a first bending mode and higher bending mode frequencies.

8. The vibratory flow meter (5) of claim 1, wherein the vibratory flow meter is operated at a plurality of frequencies to generate a plurality of vibrational responses, wherein the plurality of vibrational responses are compared in order to determine an approximate onset of multi-phase effects.

9. The vibratory flow meter (5) of claim 1, with the flow meter assembly (10) comprising two or more flow meter assemblies (10) that are vibrated to generate the very low frequency response and the very high frequency response.

10. A method for determining one or more flow fluid characteristics of a multi-phase flow fluid, the method comprising:
vibrating a vibratory flow meter assembly at one or more very low frequencies that are below a predetermined minimum decoupling frequency for the flow fluid and vibrating the flow meter assembly at one or more very high frequencies that are above a predetermined maximum decoupling frequency for the flow fluid, independent of the foreign material size or the foreign material composition;
receiving one or more very low frequency vibrational responses and one or more very high frequency vibrational responses; and
determining the one or more flow fluid characteristics from the one or more very low frequency vibrational responses and the one or more very high frequency vibrational responses.

11. The method of claim 10, with the one or more very low frequencies resulting in a decoupling ratio $(A_p/A_f)$ of about 1:1 and with the one or more very high frequencies resulting in a decoupling ratio $(A_p/A_f)$ of about 3:1 for entrained gas and about equal to $3/(1+(2*\rho_p/\rho_f))$ for entrained solids.

12. The method of claim 10, with the one or more very low frequencies resulting in a viscosity that is effectively infinity with regard to particle motion for the flow fluid and with the one or more very high frequencies resulting in a viscosity that is effectively zero.

13. The method of claim 10, wherein the one or more very low frequencies are below a predetermined minimum SOS/compressibility threshold, independent of a foreign material size or a foreign material composition.

14. The method of claim 10, wherein the one or more very low frequency vibrational responses correspond to an inverse Stokes number (δ) that is above about 3.5 and wherein the one or more very high frequency vibrational responses correspond to an inverse Stokes number (δ) that is less than about 0.1.

15. The method of claim 10, with the vibratory flow meter being configured to operate at a first bending mode and higher bending mode frequencies.

16. The method of claim 10, Wherein the vibratory flow meter is operated at a plurality of frequencies to generate a plurality of vibrational responses, wherein the plurality of vibrational responses are compared in order to determine an approximate onset of multi-phase effects.

17. The method of claim 10, with vibrating the vibratory flow meter assembly at the one or more very low frequencies and at the one or more very high frequencies comprising vibrating two or more vibratory flow meter assemblies.

18. A method of forming a vibratory flow meter for determining one or more flow fluid characteristics of a multi-phase flow fluid, the method comprising:
determining at least one predetermined very low frequency and at least one predetermined very high frequency for the vibratory flow meter based on at least an expected flow fluid, with the at least one predetermined very low frequency being below a predetermined minimum decoupling frequency and with the at least one predetermined very high frequency being above a predetermined maximum decoupling frequency for the flow fluid, independent of a foreign material size or a foreign material composition;
selecting one or more flow conduit design characteristics based on the at least one predetermined very low frequency and on the at least one predetermined very high frequency, with the one or more flow conduit design characteristics being selected to substantially achieve the at least one predetermined very low frequency and the at least one predetermined very high frequency; and
constructing the vibratory flow meter employing the selected one or more flow conduit design characteristics.

19. The method of claim 18, with the at least one predetermined very low frequency resulting in a decoupling ratio $(A_p/A_f)$ of about 1:1 and with the at least one predetermined very high frequency resulting in a decoupling ratio $(A_p/A_f)$ of about 3:1 for entrained gas and about equal to $3/(1+(2*\rho_p/\rho_f))$ for entrained solids.

20. The method of claim 18, with the at least one predetermined very low frequency resulting in a viscosity that is effectively infinity with regard to particle motion for the flow fluid and with the at least one predetermined very high frequency resulting in a viscosity that is effectively zero.

21. The method of claim 18, wherein the at least one predetermined very low frequency is below a predetermined minimum SOS/compressibility threshold, independent of a foreign material size or a foreign material composition.

22. The method of claim 18, wherein the at least one predetermined very low frequency corresponds to an inverse Stokes number (δ) that is above about 3.5 and wherein the at least one predetermined very high frequency corresponds to an inverse Stokes number (δ) that is less than about 0.1.

23. The method of claim 18, with the vibratory flow meter being configured to operate at a first bending mode and higher bending mode frequencies.

24. The method of claim 18, wherein the vibratory flow meter is operated at a plurality of frequencies to generate a plurality of vibrational responses, wherein the plurality of vibrational responses are compared in order to determine an approximate onset of multi-phase effects.

25. The method of claim 18, with vibrating the vibratory flow eter assembly at the one or more very low frequencies and at the one or more very high frequencies comprising vibrating two or more vibratory flow meter assemblies.

* * * * *

UNITED STATES PATENT AND TRADEMARK OFFICE
CERTIFICATE OF CORRECTION

PATENT NO. : 8,322,230 B2
APPLICATION NO. : 12/937587
DATED : December 4, 2012
INVENTOR(S) : Joel Weinstein Page 1 of 1

It is certified that error appears in the above-identified patent and that said Letters Patent is hereby corrected as shown below:

Column 34, Line 62 replace "eter" with --meter--

Signed and Sealed this
Nineteenth Day of March, 2013

Teresa Stanek Rea
*Acting Director of the United States Patent and Trademark Office*